US012236782B2

(12) United States Patent
Yoshioka

(10) Patent No.: US 12,236,782 B2
(45) Date of Patent: Feb. 25, 2025

(54) APPARATUS, METHOD, AND COMPUTER PROGRAM FOR CALCULATING DELAY TIME

(71) Applicant: SUMITOMO ELECTRIC INDUSTRIES, LTD., Osaka (JP)

(72) Inventor: Toshiya Yoshioka, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 141 days.

(21) Appl. No.: 18/023,951

(22) PCT Filed: Jul. 6, 2021

(86) PCT No.: PCT/JP2021/025485
§ 371 (c)(1),
(2) Date: Feb. 28, 2023

(87) PCT Pub. No.: WO2022/085249
PCT Pub. Date: Apr. 28, 2022

(65) Prior Publication Data
US 2023/0316905 A1 Oct. 5, 2023

(30) Foreign Application Priority Data
Oct. 19, 2020 (JP) ................................ 2020-175372

(51) Int. Cl.
*G08G 1/01* (2006.01)
*G08G 1/052* (2006.01)

(52) U.S. Cl.
CPC ........... *G08G 1/052* (2013.01); *G08G 1/0112* (2013.01)

(58) Field of Classification Search
CPC . G01C 21/3647; G01C 21/3676; G06V 20/58
See application file for complete search history.

(56) References Cited

U.S. PATENT DOCUMENTS

2021/0174672 A1 6/2021 Sakakibara

FOREIGN PATENT DOCUMENTS

| | | | |
|---|---|---|---|
| JP | 2009-140292 | A | 6/2009 |
| JP | 2013-167943 | A | 8/2013 |
| JP | 2013-232160 | A | 11/2013 |
| WO | 2020/071040 | A1 | 4/2020 |

*Primary Examiner* — Mathew Franklin Gordon
(74) *Attorney, Agent, or Firm* — Oliff PLC

(57) ABSTRACT

An apparatus includes an acquisition unit configured to acquire probe information of a probe vehicle traveling on inflow road to intersection and information processing unit configured to execute calculation process for calculating delay time per vehicle due to waiting at traffic signal on inflow road, by using probe information as source data. First calculation process includes calculating, based on probe information, plurality of section speeds, each an average speed of a vehicle over corresponding one of plurality of sections, obtained by dividing inflow road, second process for calculating, based on plurality of section speeds, total number of sections that is the total number included in traffic-signal waiting section of inflow road, third process for calculating, based on total sections, average travel time over traffic-signal waiting section, and fourth process for calculating delay time, based on total sections and average travel time over traffic-signal waiting section.

10 Claims, 14 Drawing Sheets

$G_c = V_{in} R / (S_f - V_{in})$ ······(13)

STOP LINE PASSING TIME OF TAIL-END VEHICLE $D = 0.5\{(R + G_c) R V_{in}\}$ ······(14)

TOTAL DELAY TIME PER CYCLE $d_{av} = D/(C V_{in}) = 0.5\{(R + G_c) R\}/C$ ······(15)

DELAY TIME PER VEHICLE

If $d_{av} \leqq R/2$ (UNSATURATED) $V_{in} = \{1 - R^2/(2 d_{av} C)\} S_f$ ······(10)

APPARATUS, METHOD, AND COMPUTER PROGRAM FOR CALCULATING DELAY TIME

TECHNICAL FIELD

The present disclosure relates to an apparatus, a method, and a computer program for calculating a delay time.

This application claims priority based on Japanese Patent Application No. 2020-175372 filed on Oct. 19, 2020, the entire contents of which are incorporated herein by reference.

BACKGROUND ART

PTL 1 describes an apparatus for calculating a traffic index. The apparatus includes a first calculation unit that calculates normalized data representing a traffic variable of an inflow road at a target intersection as a ratio to a saturation traffic flow rate, and a second calculation unit that calculates, using the calculated normalized data, the traffic index defined by an equation in which the traffic variable of the inflow road is included in a numerator and the saturation traffic flow rate is included in a denominator.

In the calculation apparatus of the PTL 1, a delay time per vehicle due to waiting at a traffic signal on the inflow road is calculated from an average travel time of a probe vehicle, and the normalized data is calculated based on the calculated delay time.

CITATION LIST

Patent Literature

PTL1: International Publication No. WO 2020/071040

SUMMARY OF INVENTION

An apparatus according to an aspect of the present disclosure includes an acquisition unit configured to acquire probe information of a probe vehicle traveling on an inflow road to an intersection and an information processing unit configured to execute a calculation process for calculating a delay time per vehicle due to waiting at a traffic signal on the inflow road, by using the probe information as source data. The calculation process includes a first process for calculating, based on the probe information, a plurality of section speeds that are each an average speed of a vehicle over a corresponding one of a plurality of sections obtained by dividing the inflow road, a second process for calculating, based on the plurality of section speeds, the total number of sections that is the total number of sections included in a traffic-signal waiting section of the inflow road, a third process for calculating, based on the total number of sections, an average travel time over the traffic-signal waiting section, and a fourth process for calculating the delay time, based on the total number of sections and the average travel time over the traffic-signal waiting section.

A method according to an aspect of the present disclosure includes acquiring probe information of a probe vehicle traveling on an inflow road to an intersection; and executing a calculation process for calculating a delay time per vehicle due to waiting at a traffic signal on the inflow road, by using the probe information as source data. The calculation process includes a first process for calculating, based on the probe information, a plurality of section speeds that are each an average speed of a vehicle over a corresponding one of a plurality of sections obtained by dividing the inflow road, a second process for calculating, based on the plurality of section speeds, the total number of sections that is the total number of sections included in a traffic-signal waiting section of the inflow road, a third process for calculating, based on the total number of sections, an average travel time over the traffic-signal waiting section, and a fourth process for calculating the delay time, based on the total number of sections and the average travel time over the traffic-signal waiting section.

A computer program according to an aspect of the present disclosure is a computer program for causing a computer to function as an acquisition unit configured to acquire probe information of a probe vehicle traveling on an inflow road to an intersection and an information processing unit configured to execute a calculation process for calculating a delay time per vehicle due to waiting at a traffic signal on the inflow road, by using the probe information as source data. The calculation process includes a first process for calculating, based on the probe information, a plurality of section speeds that are each an average speed of a vehicle over a corresponding one of a plurality of sections obtained by dividing the inflow road, a second process for calculating, based on the plurality of section speeds, the total number of sections that is the total number of sections included in a traffic-signal waiting section of the inflow road, a third process for calculating, based on the total number of sections, an average travel time over the traffic-signal waiting section, and a fourth process for calculating the delay time, based on the total number of sections and the average travel time over the traffic-signal waiting section.

DETAILED DESCRIPTION

Figure 1:
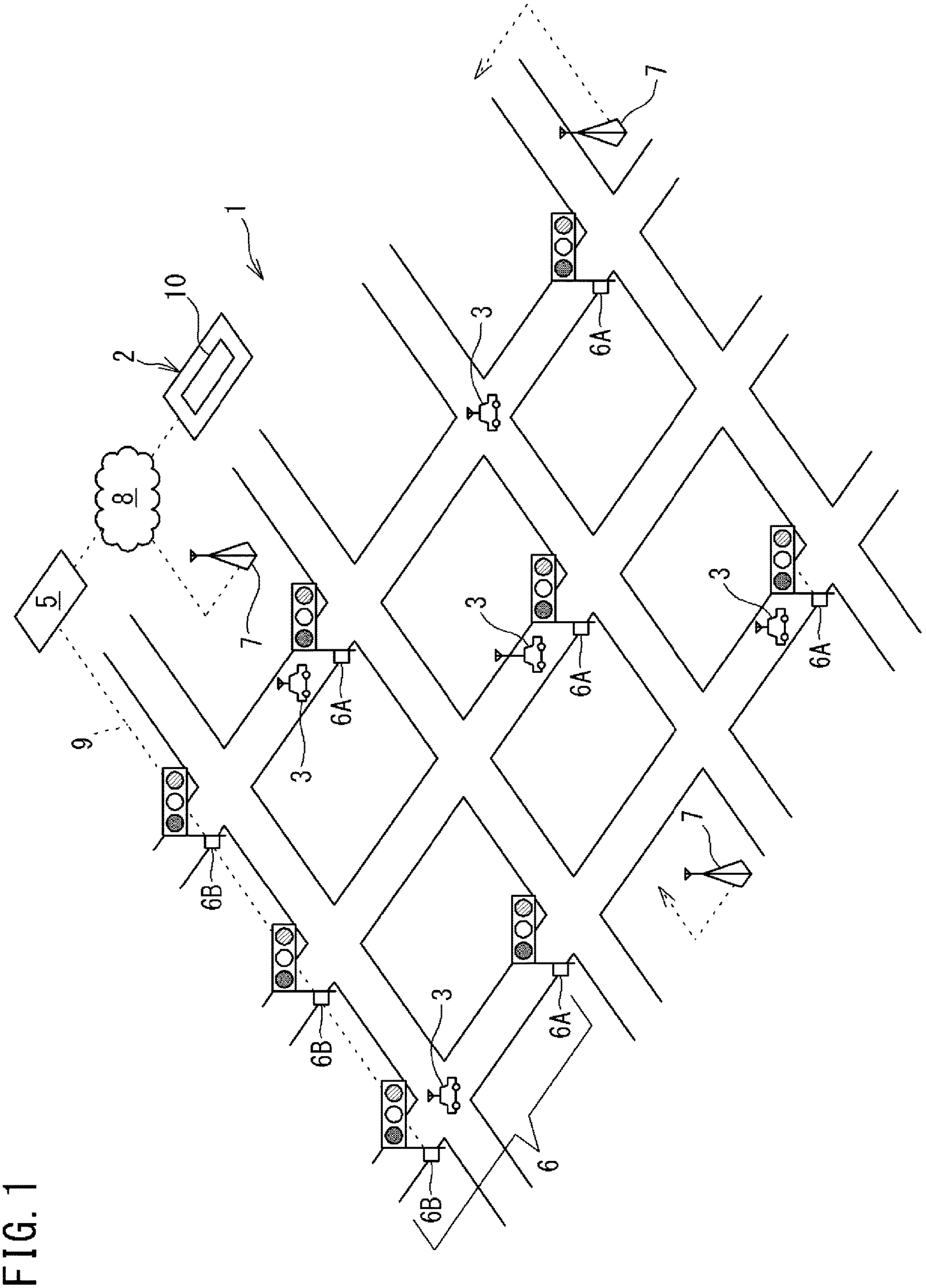
FIG. 1 is a diagram of a traffic signal control system, illustrating its overall configuration.

Problems to be Solved by Present Disclosure

In a conventional calculation apparatus, a link travel time from an intersection located upstream to a target intersection is adopted as an average travel time of a probe vehicle. Accordingly, when a stop event other than waiting at a traffic signal has occurred in the probe vehicle, the delay time may be longer than an actual delay time.

In view of such conventional problems, an object of the present disclosure is to improve an accuracy of calculation of the delay time per vehicle due to waiting at a traffic signal.

Advantageous Effects of Present Disclosure

According to the present disclosure, the accuracy of calculation of the delay time per vehicle due to waiting at a traffic signal can be improved.

Description of Embodiments of Present Disclosure

An overview of embodiments according to the present invention will be listed and described below.

(1) A calculation apparatus according to the present embodiment includes an acquisition unit configured to acquire probe information of a probe vehicle traveling on an inflow road to an intersection and an information processing unit configured to execute a calculation process for calculating a delay time per vehicle due to waiting at a traffic signal on the inflow road, by using the probe information as source data. The calculation process includes a first process for calculating, based on the probe information, a plurality of section speeds that are each an average speed of a vehicle over a corresponding one of a plurality of sections obtained by dividing the inflow road, a second process for calculating, based on the plurality of section speeds, the total number of sections that is the total number of sections included in a traffic-signal waiting section of the inflow road, a third process for calculating, based on the total number of sections, an average travel time over the traffic-signal waiting section, and a fourth process for calculating the delay time, based on the total number of sections and the average travel time over the traffic-signal waiting section.

According to the calculation apparatus of the present embodiment, the average travel time over the traffic-signal waiting section is calculated based on the total number of sections that is the total number of sections included in the traffic-signal waiting section of the inflow road, and the delay time is calculated based on the total number of sections and the average travel time over the traffic-signal waiting section. This allows the delay time per vehicle due to waiting at a traffic signal on the inflow road to be accurately calculated regardless of whether there is a stop event other than waiting at a traffic signal.

(2) In the calculation apparatus according to the present embodiment, the second process may include a search process for searching for, in order from downstream to upstream of the inflow road, a section satisfying a speed condition in which the section speed is less than or equal to a speed threshold, and counting a section satisfying the speed condition as a section included in the traffic-signal waiting section.

The reason is that the section satisfying the speed condition is estimated to be a section in which the probe vehicle has been slowed down or stopped due to waiting at a traffic signal.

(3) In the calculation apparatus according to the present embodiment, the second process may include a process for continuing the search process when a length obtained by adding together respective section lengths of one or more sections not satisfying the speed condition is less than a distance threshold.

The reason is that when the section that does not satisfy the speed condition is short, this short section can result from repetition of stopping and running of the probe vehicle in the traffic-signal waiting section, and it cannot be necessarily said that the section being searched has reached upstream of the traffic-signal waiting section.

(4) In the calculation apparatus according to the present embodiment, the second process may include a process for setting the count value of a section satisfying the speed condition and located most upstream as the total number of sections when a length obtained by adding together respective section lengths of one or more sections in which the section speed exceeds the speed threshold is greater than or equal to a distance threshold.

The reason is that when the length of the section that does not satisfy the speed condition is greater, it is considered that the section being searched has reached upstream of the traffic-signal waiting section, and the most upstream section that satisfies the speed condition in the previous search can be estimated to be the end of the traffic-signal waiting section.

(5) In the calculation apparatus according to the present embodiment, each of the plurality of sections may have a section length with a value smaller than an interval at which vehicle detectors each configured to measure a vehicle speed are installed (e.g., 200 m).

In this manner, the measurement granularity of the average speed of the vehicle becomes finer than when the average speed of the vehicle is measured by the vehicle detectors. This allows the traffic-signal waiting section determined according to the total number of sections to be calculated more finely, and the calculation accuracy of the delay time to be improved.

(6) In the calculation apparatus according to the present embodiment, the third process may be a process for calculating the average travel time over the traffic-signal waiting section by using the following Equation (16). In this case, the average travel time of the traffic-signal waiting section can be accurately calculated by using the following Equation (16).

[Math. 1]

$$Tt = \sum_{i=1}^{I} \{Li/(Vi/3.6)\} \tag{16}$$

where Ttt is the average travel time (seconds) over the traffic-signal waiting section, Li is a length (m) of section i, Vi is an average speed (km/h) over section i, I is the total number of sections in the traffic-signal waiting section, and i is an identification number of a section assigned in order from downstream to upstream.

(7) In the calculation apparatus according to the present embodiment, the fourth process may be a process for calculating the delay time by using the following Equation (17). In this case, the delay time per vehicle due to waiting at a traffic signal can be accurately calculated by using the following Equation (17).

[Math. 2]

$$dav = Ttt - \sum_{i=1}^{I}\{Li/(Ve/3.6)\} \tag{17}$$

where dav is a delay time (an average value) (seconds) per vehicle due to waiting at the traffic signal, Ttt is the average travel time (seconds) over the traffic-signal waiting section, Li is a length (m) of section i, Ve is an expected speed (for example, a regulatory speed) (km/h), I is the total number of sections in the traffic-signal waiting section, and i is an identification number of a section assigned in order from downstream to upstream.

(8) In the calculation apparatus according to the present embodiment, the inflow road may be an inflow road having a plurality of lanes given right of way defined by the same phase. The information processing unit may be configured to execute the second process on each of the plurality of lanes to calculate a plurality of total numbers of sections, and execute the third process and the fourth process, based on a maximum total number of sections among the plurality of total numbers of sections calculated in the second process.

In this case, the delay time on a lane on which many vehicles cannot pass a stop line among a plurality of lanes processed with the same phase is calculated. This allows the traffic index of the intersection to be accurately calculated in accordance with the actual traffic situation, and the accuracy of calculation of a signal control parameter to be improved.

(9) A calculation method according to the present embodiment is a calculation method executed by the calculation apparatus according to any one of (1) to (8) described above. Accordingly, the calculation method according to the present embodiment has the same operational effects as the calculation apparatus according to any one of (1) to (8) described above.

(10) A computer program according to the present embodiment is a computer program for causing a computer to function as the calculation apparatus according to any one of (1) to (8) described above. Accordingly, the computer program according to the present embodiment has the same operational effects as the calculation apparatus according to any one of (1) to (8) described above.

Details of Embodiments of Present Invention

Hereinafter, embodiments according to the present invention will be described in detail with reference to the drawings. At least some of the embodiments described below may be combined in any combination.

Definition of Terms

In describing the details of the present embodiments, terms used in the present specification will first be defined.

"Vehicle": Every vehicle traveling on a road. Accordingly, in addition to an automobile, a light vehicle, and a trolley bus, a motorcycle also corresponds to a vehicle.

In the present embodiment, when the term "vehicle" is simply used, the term includes both a probe vehicle having an on-vehicle device capable of transmitting probe information and a normal vehicle without the on-vehicle device.

"Probe information": Various types of information on a vehicle sensed by the probe vehicle traveling on a road. The probe information is also referred to as probe data or floating car data. The probe information can include various kinds of vehicle data such as identification information of a probe vehicle, a vehicle position, a vehicle speed, a vehicle direction, and occurrence times thereof. As the probe information, information such as a position and an acceleration obtained by, for example, a smartphone and a tablet in the vehicle may be used.

"Probe vehicle": A vehicle that senses probe information and transmits it to the outside. Vehicles traveling on a road include both a probe vehicle and a vehicle other than the probe vehicle. However, even a normal vehicle without an on-vehicle device capable of transmitting probe information is included in the probe vehicle as long as the vehicle has, for example, a smartphone and a tablet PC as described above that can transmit probe information such as positional information of the vehicle to the outside.

"Signal control parameter": A temporal element of signal display such as a cycle length, a split, or an offset is collectively referred to as a signal control parameter or a signal control constant.

"Cycle length": The duration of one cycle from the start time of one green (or red) lighting to the start time of the next green (or red) lighting of a traffic signal unit. In Japan, it is prescribed by laws and regulations that a green signal light color is called blue.

"Phase": A signal phase representing a relationship between display states of respective light units included in the traffic signal unit. "Phase" indicates right of way for each inflow road given to, for example, a vehicle and a pedestrian at an intersection and a time zone in which the right of way is given.

"Split": The ratio of the length of time allocated to each phase to the cycle length. The split is generally expressed as a percentage or ratio. In a strict sense, the split is a value obtained by dividing an effective green interval by the cycle length.

"Offset": In coordinated control or area control, an offset is a deviation of a certain time point of signal indication, e.g., a starting time point of major-road green light, from a reference time point common to a group of traffic signal units, or a deviation in the same signal indication starting time point between adjacent intersections. The former is referred to as an absolute offset and the latter is referred to as a relative offset, which are expressed in seconds or as a percentage of a period.

"Green interval": The time zone in which a vehicle is given right of way at an intersection. The end time point of the green interval may be set to the turn-off time point of a green light unit in the earliest case, and to the turn-off time point of a yellow light unit in the latest case. At an intersection having an arrow light unit, the end time point of the green interval may be the end time point of a right-turn arrow.

"Red interval": The time zone in which a vehicle is not given right of way at an intersection. The start time point of the red interval may be set to the turn-off time point of a green light unit in the earliest case, and to the turn-off time point of a yellow light unit in the latest case. At an intersection having an arrow light unit, the start time point of the red interval may be the end time point of the right-turn arrow.

As described above, in the present embodiment, a time zone included in one cycle is roughly divided into the green interval with right of way and the red interval without right of way. Thus, when the green interval is G, the red interval is R, and the cycle length is C, there is a relationship of C=G+R.

For this reason, (C-G) may be used instead of R in a calculation equation including R (for example, Equation (10) and Equation (11) described later). That is, the red interval R in the present embodiment may be a value calculated indirectly from cycle length C and green interval G.

"Queue": A queue of vehicles that are stopped before an intersection and wait for a signal light to change from red, for example.

"Link": A road section having an upward or downward direction that connects nodes such as intersections. When viewed from a certain intersection, a link in a direction of inflow toward the intersection is referred to as an inflow link, and when viewed from a certain intersection, a link in a direction of outflow from the intersection is referred to as an outflow link.

"Travel time": The time required for a vehicle to travel a certain section. The travel time may include an intermediate stop time and a delay time.

"Link travel time": The travel time when a road section as the unit of travel time calculation is a "link". That is a travel time required for a vehicle to travel from the start point to the end point of one link.

"Traffic capacity": The traffic capacity of a road refers to the maximum number of vehicles that can reasonably pass a predetermined section of one lane or a road in one direction within a predetermined time period under road conditions such as a shape, width, and slope of a road, and traffic conditions such as a vehicle type configuration and a speed limit. However, for a road having 2 lanes or 3 lanes, both traffic volumes are taken.

"Traffic volume": The number of passing vehicles within a unit time. Unless otherwise specified, the traffic volume is expressed by the number of passing vehicles for one hour. For control and evaluation purposes, however, a traffic volume in a unit of shorter period such as seconds, 5 minutes, or 15 minutes may be used. In general, the traffic volume increases in accordance with a traffic demand, but decreases when the traffic demand exceeds the traffic capacity.

"Load ratio": In an oversaturated state, it is necessary to consider a "load traffic volume" obtained by adding the number of queuing vehicles that cannot pass a stop line, to a traffic volume passing through a stop line as a variable to be controlled.

The ratio of the load traffic volume per unit time (traffic flow rate) to a saturation traffic flow rate is referred to as a load ratio. The load ratio is equivalent to a demand rate when the number of vehicles that cannot pass a stop line due to an oversaturated state is few.

"Traffic demand": For each intersection or inflow road, or for each traffic route, a traffic volume or a traffic flow rate that arrives at a stop line of the inflow road within a certain period of time is referred to as a traffic demand.

"Traffic flow rate": The value obtained by converting the number of vehicles passing through a certain cross section of a lane or a roadway in a certain time (usually less than one hour) into a value per unit time (usually one hour) is referred to as a traffic flow rate.

For example, when a traffic volume for 15 minutes is 90 vehicles, a traffic flow rate for 15 minutes is 360 (vehicles/hour) or 6 (vehicles/minute). The traffic flow rate is an inverse of an average headway of vehicles passing through during a period of time of interest.

"Oversaturation/unsaturation/near-saturation": When some queuing vehicles cannot pass a stop line by the end of green light by the end of green light, a traffic demand exceeds a traffic capacity. This state is referred to as an "oversaturated state".

On the other hand, the state in which the traffic demand is equal to or less than the traffic capacity and a queue of vehicles waiting at a traffic signal is cleared away by the end of green light is referred to as an "unsaturated state". The state in which a demand rate is high (for example, 0.85 or more), but not oversaturated, is referred to as a near-saturation. The demand rate is less than 1.

"Saturation traffic flow rate": The maximum number of vehicles that can pass through a stop line per lane and per unit time (for example, one second) in an inflow area of an intersection when there is a sufficient traffic demand is referred to as a saturation traffic flow rate.

The value of the saturation traffic flow rate varies when the traffic flow line varies, for example, when there is an exclusive right-turn lane or an exclusive left-turn lane in addition to a through lane. The value of saturation traffic flow rate also varies depending on road or traffic conditions such as a lane width and a commercial vehicles ratio.

"Point control": Traffic signal control can be classified into three types of control: a point control, a coordinated control, and a wide-area control, based on the number of intersections and a spatial configuration. Among these types of control, the point control is a method in which a signalized intersection is independently controlled.

"Coordinated control": A method for controlling a series of adjacent intersections by interlocking them with each other. This method is characterized in that a common cycle length (common cycle length of a system) and an offset are set for a plurality of signals to be coordinately controlled.

"Wide-area control": This is a method for collectively controlling a large number of traffic signal units installed in a road network spreading in a planar manner. This method is an area-expanded one of route coordinated control.

"Fixed-time control": The traffic signal control may be classified into three types of control: fixed-time control, traffic actuated control, and traffic adaptive control, according to a method for setting a signal control parameter.

Among these types of control, the fixed-time control is a method in which a signal control parameter is set in advance according to a time zone. The fixed-time control is performed by selecting one of a combination (referred to as a program) of the signal control parameter set in advance according to, for example, a time zone and a dav of the week (weekday, Saturday, Sunday, and holiday).

"Traffic actuated control": Among methods for controlling a traffic signal by using vehicle detectors, a method in which control is performed for each signal controller. This control is also referred to as terminal actuated control.

In the traffic actuated control, the start and end points of green light are determined in response to a change in traffic demand over a short period of time, resulting in changes in a green interval length and a cycle length.

"Traffic adaptive control": A control method in which a central apparatus of a traffic control center changes signal control parameters for traffic signal controllers of an important intersection or for traffic signal controllers of a plurality of intersections controlled by coordinated control or wide-area control as traffic signal controllers to be controlled. Since the central apparatus remotely controls one or more traffic signal controllers, it is also referred to as "remote control" in the present embodiment.

Since the traffic adaptive control enables highly coordinated control in response to a change in traffic flow, the traffic adaptive control is applied to a road where a traffic volume and a temporal change thereof are larger and a higher efficiency of traffic processing is required.

The traffic adaptive control is classified into two types: "program selection control" and "program formation control". The program selection control is a method for selecting, from a plurality of combinations (programs) prepared in advance, a combination suitable for the current traffic situation based on, for example, information from a vehicle detector.

The program formation control is a method for immediately determining a switching timing of a signal control parameter or a signal light color based on, for example, information from a vehicle detector without preparing a finite number of combinations of signal control parameter.

"MODERATO" (Management by Origin-Destination Related Adaptation for Traffic Optimization): This is the name of program formation control in the Japanese Universal Traffic Management System (UTMS).

The MODERATO is a system that automatically generates a signal control parameter from a load ratio (=(inflow traffic volume+the number of queuing vehicles)/saturation traffic flow rate) for each inflow road at an intersection.

"SCOOT" (Split Cycle Offset Optimisation Technique): A method for program formation control developed in the United Kingdom. This is widely adopted especially in European countries.

The SCOOT is a system that uses data from a vehicle detector installed on a road to automatically adjust a signal light color of a traffic signal unit so as to adapt to current traffic conditions in near real-time.

"SCATS" (Sydney Coordinated Adaptive Traffic System): A method for program selection control developed in Australia. This is adopted for about 42000 intersections of 1800 or more cities in about 40 countries.

The SCATS is a system that finds the best signal control parameter (cycle length, split and offset) for current traffic by selecting an automatic plan from a library in response to data obtained from, for example, a loop detector installed on a road.

Overall Configuration of System

FIG. 1 is a diagram of a traffic signal control system 1 according to the present embodiment, illustrating its overall configuration.

Figure 2:
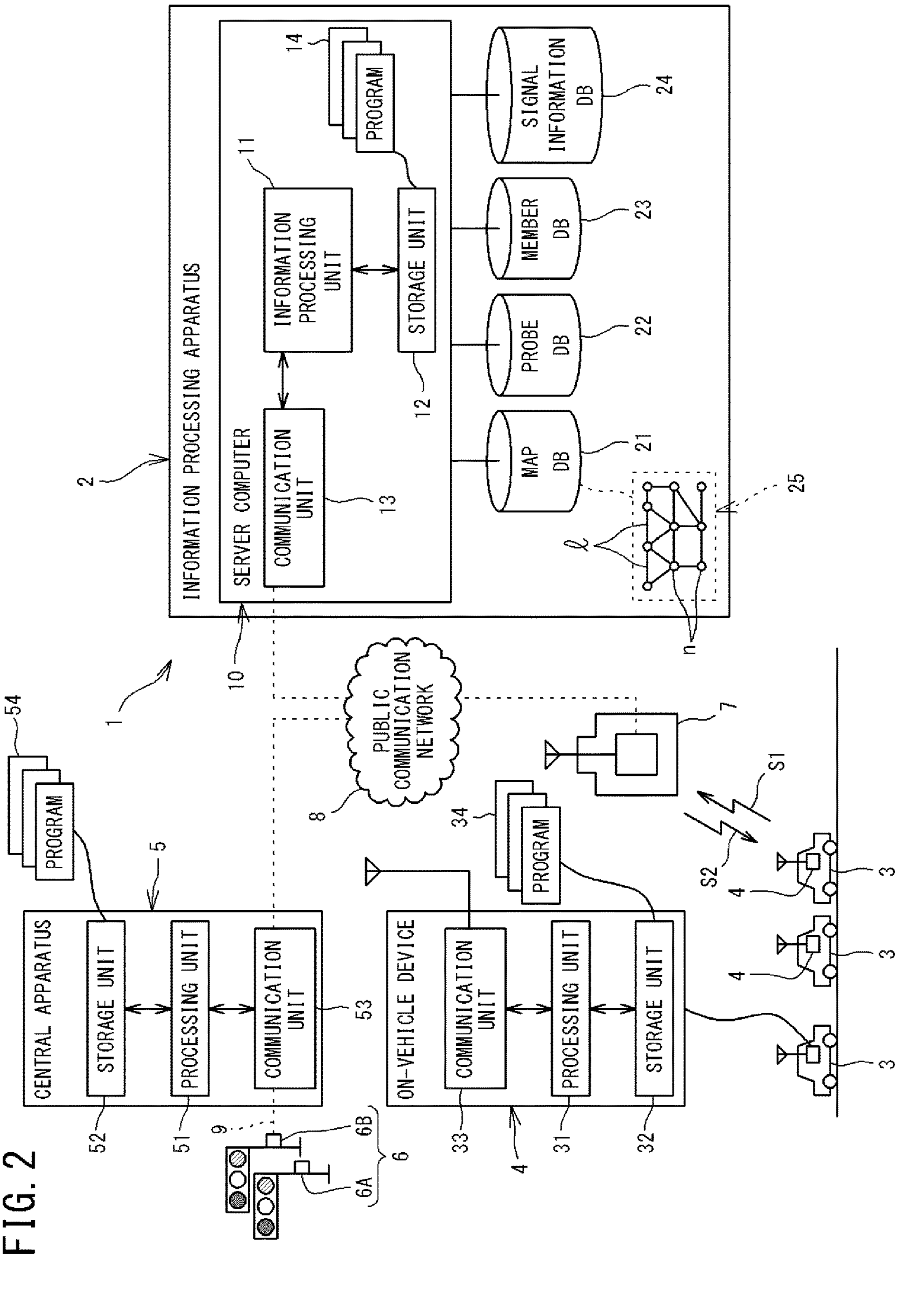
FIG. 2 is a block diagram of an information processing apparatus, an on-vehicle device of a probe vehicle, and a central apparatus included in a traffic signal control system.

FIG. 2 is a block diagram of an information processing apparatus 2, an on-vehicle device 4 of a probe vehicle 3, and a central apparatus 5 included in traffic signal control system 1.

As illustrated in FIGS. 1 and 2, traffic signal control system 1 includes, for example, information processing apparatus 2 installed in, for example, a data center, on-vehicle device 4 mounted on probe vehicle 3, central apparatus 5 installed in a traffic control center, traffic signal controller 6 installed in each intersection.

Traffic signal control system 1 according to the present embodiment is a system in which information processing apparatus 2 collects probe information including a vehicle position and its passing time from probe vehicle 3 and obtains signal information of an intersection from central apparatus 5 to calculate a traffic index such as a load ratio necessary for generating a signal control parameter of the intersection using the probe information and the signal information.

In this manner, information processing apparatus 2 in the present embodiment functions as an "apparatus for calculating the traffic index" necessary for generating a signal control parameter. Information processing apparatus 2 in the present embodiment also functions as an "apparatus for calculating a delay time" per vehicle due to waiting at a traffic signal on an inflow road, which is source data of the traffic index such as the load ratio.

An entity of operating information processing apparatus 2 is not particularly limited. For example, the entity of operating information processing apparatus 2 may be a manufacturer of vehicle 3, an IT company that performs business of providing various types of information, or other entity, or may be a public entity in charge of traffic control that operates central apparatus 5.

The operation form of a server of information processing apparatus 2 may be either an on-premise server or a cloud server.

On-vehicle device 4 of probe vehicle 3 can perform wireless communication with a wireless base station 7 (for example, a mobile base station) in each place. Wireless base station 7 can communicate with information processing apparatus 2 via a public communication network 8 such as the Internet.

Therefore, on-vehicle device 4 can wirelessly transmit uplink information S1 addressed to information processing apparatus 2 to wireless base station 7. In addition, information processing apparatus 2 can transmit downlink information S2 addressed to specific on-vehicle device 4 to public communication network 8.

Configuration of Information Processing Apparatus

As illustrated in FIG. 2, information processing apparatus 2 includes a server computer 10 having a workstation, and various databases 21 to 24 connected to server computer 10. Server computer 10 includes an information processing unit 11, a storage unit 12, and a communication unit 13.

Storage unit 12 is a storage apparatus including at least one non-volatile memory (recording medium) of a hard disk drive (HDD) or a solid state drive (SSD), and a volatile memory (recording medium) such as a random access memory. The non-volatile memory may be removable.

Information processing unit (hereinafter, also referred to as a "processing unit") 11 includes an arithmetic processing unit including a central processing unit (CPU) that reads a computer program 14 stored in the nonvolatile memory of storage unit 12 and performs information processing in accordance with computer program 14.

Computer program 14 of information processing apparatus 2 includes a program for causing the CPU of processing unit 11 to execute a calculation process for calculating a specified traffic index, such as a calculation of a delay time of probe vehicle 3 due to waiting at a traffic signal and a calculation of a load ratio based on the delay time.

Communication unit 13 includes a communication interface that communicates with central apparatus 5 and wireless base station 7 via public communication network 8.

Communication unit 13 can receive uplink information S1 transmitted by wireless base station 7, and can transmit downlink information S2 generated by information processing apparatus 2 to wireless base station 7. Uplink information S1 includes probe information transmitted from on-vehicle device 4. Downlink information S2 includes, for example, a link travel time calculated by processing unit 11.

Communication unit 13 can receive signal information of an intersection included in a traffic control area transmitted by central apparatus 5 to information processing apparatus 2. The signal information of the intersection includes at least a cycle length and a red interval length of the intersection.

Communication unit 13 may be connected to central apparatus 5 of the traffic control center via a dedicated communication line 9 instead of public communication network 8.

Various databases 21 to 24 include a mass storage such as an HDD or an SSD. Databases 21 to 24 are each connected to server computer 10 so as to be able to transfer data.

Databases 21 to 24 include a map database 21, a probe database 22, a member database 23, and a signal information database 24.

Road map data 25 covering the entire country is recorded in map database 21. Road map data 25 includes "intersection data" and "link data".

The "intersection data" is data in which an intersection ID assigned to a domestic intersection is associated with position information of the intersection. The "link data" includes data in which the following information 1) to 4) is associated with a link ID of a specific link assigned corresponding to a road in the country.

Information 1): Position information of a start point, an end point, and an interpolation point of a specific link, Information 2): Link ID connected to the start point of the specific link, Information 3): Link ID connected to the end point of the specific link, and Information 4): Link cost of the specific link Road map data 25 constitutes a network corresponding to an actual road line shape and a traveling direction of the road. Therefore, road map data 25 is a network in which road sections between nodes n representing intersections are connected by directed links 1 (lower-case character 1).

Specifically, road map data 25 includes a directed graph in which a node n is set for each intersection and each node n is connected by a pair of directed links 1 in opposite directions to each other. Thus, for a one way road, node n is connected only to directed link 1 in one direction.

Road map data 25 includes road type information indicating whether a specific directed link 1 corresponding to each road on the map is an ordinary road or a toll road, facility information indicating a type of facility such as a tollgate or a parking area included in directed link 1, and other information.

In probe database 22, probe information received from probe vehicle 3 registered in advance in information processing apparatus 2 is stored for each identification information of vehicle 3.

The stored probe information includes at least the vehicle position and its passing time. The probe information may include vehicle data such as a vehicle speed, a vehicle direction, and a vehicle state information (stop/running event). A sensing period of the probe information is a granularity with which a travel history of probe vehicle 3 can be accurately specified, and is 0.5 to 1.0 seconds, for example.

In member database 23, personal information such as the address and name of an owner (registered member) of probe vehicle 3, a vehicle identification number (VIN), and identification information (for example, at least one of a MAC address, an e-mail address, a telephone number, or other information) of on-vehicle device 4 are recorded.

In signal information database 24, signal information including a cycle length and a red interval length for an inflow road at each intersection is stored for each intersection ID and each link ID.

Traffic signal controller 6 installed at each intersection of the traffic control area includes two types of traffic signal controllers: a first controller 6A and a second controller 6B.

First controller 6A: A traffic signal controller that is not to be controlled by remote control (coordinated control, wide-area control, or other control) performed by central apparatus 5, and that performs point control (fixed-time control or other control) for independently determining a signal light color.

Second controller 6B: A traffic signal controller that is to be controlled by remote control (coordinated control, wide-area control, or other control) performed by central apparatus 5.

Central apparatus 5 transmits signal information of first controller 6A to information processing apparatus 2 only when the operation is changed. Processing unit 11 updates signal information of first controller 6A included in signal information database 24 with the received signal information.

Central apparatus 5 transmits signal information of second controller 6B to information processing apparatus 2 every predetermined control period (for example, 1.0 to 2.5 minutes). Processing unit 11 updates signal information of second controller 6B included in signal information database 24 with the received signal information.

Configuration of On-Vehicle Device

As illustrated in FIG. 2, on-vehicle device 4 includes a computer apparatus including, for example, a processing unit 31, a storage unit 32, and a communication unit 33.

Processing unit 31 includes an arithmetic processing unit having a CPU that reads a computer program 34 stored in a nonvolatile memory of storage unit 32 and performs various types of information processing in accordance with computer program 34.

Storage unit 32 is a storage apparatus including at least one nonvolatile memory (recording medium) of an HDD or an SSD, and a volatile memory (recording medium) such as a random access memory.

Computer program 34 of on-vehicle device 4 includes programs for causing the CPU of processing unit 31 to execute sensing and generation of probe information, route search process of probe vehicle 3, image processing for displaying a search result on a display of a navigation apparatus, and other processing.

Communication unit 33 includes a wireless communication apparatus permanently mounted on probe vehicle 3 or a data communication terminal (for example, a smartphone, a tablet computer, or a node personal computer) temporarily mounted on probe vehicle 3.

Communication unit 33 includes, for example, a global positioning system (GPS) receiver. Processing unit 31 monitors the current position of the vehicle in near real-time based on the position information of the GPS received by communication unit 33. The positioning is preferably performed using a global navigation satellite system such as the GPS, but other methods may be used.

Processing unit 31 measures vehicle data such as a vehicle position, a vehicle speed, a vehicle direction, and CAN information of the probe vehicle at every predetermined sensing period (for example, 0.5 to 1.0 seconds) and records the vehicle data in storage unit 32 together with the measurement time.

When the vehicle data is stored in storage unit 32 for a predetermined recording time (for example, one minute), communication unit 33 generates probe information including the accumulated vehicle data and the identification information of the probe vehicle, and uplink-transmits the generated probe information to information processing apparatus 2.

On-vehicle device 4 includes an input interface (not illustrated) that receives an operation input from a driver. The input interface includes, for example, an input apparatus attached to a navigation apparatus or an input apparatus of a data communication terminal mounted on probe vehicle 3.

Configuration of Central Apparatus

As illustrated in FIG. 2, central apparatus 5 includes a server computer that integrally controls traffic signal controllers 6 of a plurality of intersections included in the traffic control area. Central apparatus 5 includes a processing unit 51, a storage unit 52, and a communication unit 53.

Traffic signal controllers 6 in the traffic control area include first controller 6A which operates independently (stand-alone) by point control and second controller 6B which is to be controlled by remote control (traffic adaptive control) performed by central apparatus 5.

Processing unit 51 includes an arithmetic processing unit including a CPU that reads a computer program 54 stored in a nonvolatile memory of storage unit 52 and performs various types of information processing in accordance with computer program 54.

Storage unit 52 is a storage apparatus including at least one nonvolatile memory (recording medium) of an HDD or an SSD, and a volatile memory (recording medium) such as a random access memory.

Computer program 54 of central apparatus 5 includes a program for performing at least one remote control (traffic adaptive control) of MODERATO, SCOOT or SCATS.

When the signal control parameter is generated by the remote control, processing unit 51 generates a signal control command to be executed by second controller 6B which is to be controlled by the remote control.

The signal control command is information on the switching timing of light color of a signal light unit corresponding to the newly generated signal control parameter, and is generated every control period (for example, 1.0 to 2.5 minutes) of the remote control.

Communication unit 53 includes a communication interface that communicates with information processing apparatus 2 via public communication network 8 and communicates with second controller 6B via dedicated communication line 9. Communication unit 53 may be connected to information processing apparatus 2 via dedicated communication line 9.

Communication unit 53 transmits the signal control command which processing unit 51 has generated every control period of the signal control parameter to second controller 6B which is to be controlled by the remote control.

Communication unit 53 transmits signal information including a cycle length and a red interval length under operation in first and second controllers 6A and 6B to information processing apparatus 2. Signal information of second controller 6B is transmitted to information processing apparatus 2 every control period (for example, 1.0 to 2.5 minutes) of the remote control.

Overview and Problems of Remote Control in Comparative Example

Figure 3:
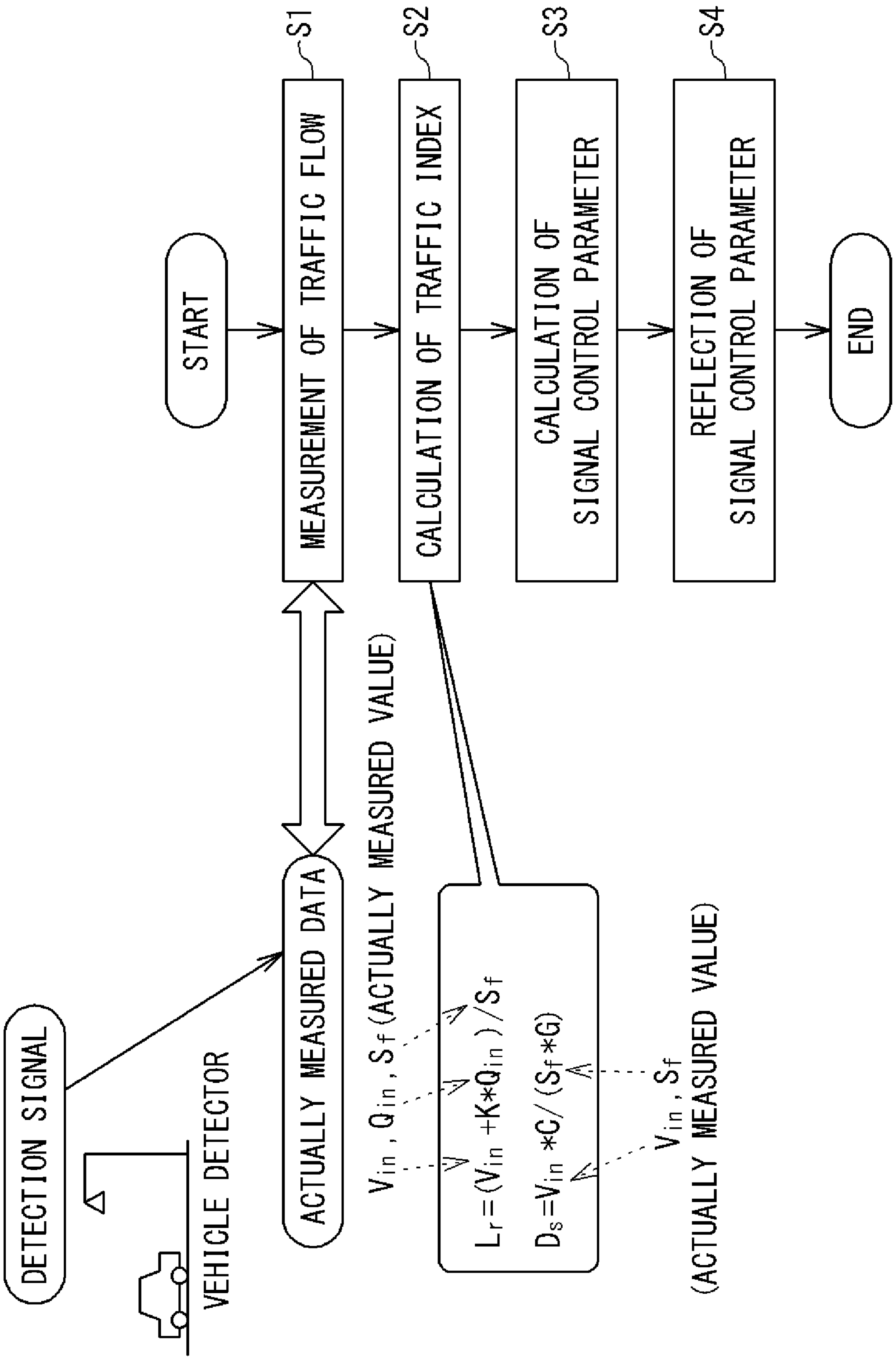
FIG. 3 is a flowchart illustrating an overview of remote control according to a comparative example.

FIG. 3 is a flowchart illustrating an overview of remote control (traffic adaptive control) according to a comparative example.

As illustrated in FIG. 3, the remote control according to the comparative example includes "measurement of traffic flow" (step S1), "calculation of traffic index" (step S2), "calculation of signal control parameter" (step S3), and "reflection of signal control parameter" (step S4).

Processing unit 51 of central apparatus 5 repeatedly executes each process of steps S1 to S4 every predetermined control period (for example, 1.0 to 2.5 minutes).

The measurement of traffic flow (step S1) is a process for measuring a traffic flow for each inflow road at an intersection to be controlled. Conventional measurement of traffic flow is a process for calculating actually measured data based on a detection signal (such as a pulse signal) of a vehicle detector. The actually measured data includes measured values of a traffic volume Vin, the number of queuing vehicles Qin, and a saturation traffic flow rate Sf. Note that Sf may be a set value based on the road structure.

The calculation of traffic index (step S2) is a process for calculating a traffic index for each inflow road necessary for calculating the signal control parameter by using the measurement result in step S1.

The traffic index used in MODERATO is a load ratio Lr. Load ratio Lr is a ratio of a traffic demand to a maximum traffic volume that can be processed during one cycle. The traffic index used in SCOOT and SCATS is a phase saturation Ds. Phase saturation Ds is a ratio of an arriving traffic volume to the maximum traffic volume that can be processed during a green interval.

Load ratio Lr is calculated by the following Equation (1). Phase saturation Ds is calculated by the following Equation (2).

$$Lr=(Vin+k\times Qin)/Sf \tag{1}$$

$$Ds=Vin\times C/(Sf\times G) \tag{2}$$

where Vin is an inflow traffic volume (vehicles/second) to an intersection, k is a weighting coefficient (for example, 1.0 is used), Qin is the number of queuing vehicles (vehicles/second) in terms of traffic volume, Sf is a saturation traffic flow rate (vehicles/second), G is an effective green interval (seconds), and C is a cycle length (seconds).

As shown in Equation (1), the equation of calculating load ratio Lr includes inflow traffic volume Vin and the number of queuing vehicles Qin as traffic variables for the inflow road. As shown in Equation (2), the equation of calculating phase saturation Ds includes inflow traffic volume Vin as a traffic variable for the inflow road.

Processing unit 51 of central apparatus 5 substitutes the actually measured values of Vin, Qin, and Sf obtained in step S1 into Equation (1) or (2) to calculate at least one traffic index of load ratio Lr or phase saturation Ds.

The calculation of signal control parameter (step S3) is a process for calculating the signal control parameter such as a split and a cycle length of the intersection to be controlled using the traffic index calculated in step S2.

In the present description, a case where central apparatus 5 adopts MODERATO and calculates a split and a cycle length of a cross intersection including only two phases is considered. In addition, the number of phase is represented by "i" (i=1, 2), and the direction of an inflow road for each phase i is represented by "j" (j=1, 2).

When the load ratio of each inflow road j for phase i is "Lij", the traffic volume of inflow road j is "Vij", the number of queuing vehicles on the inflow road j is "Qij", and the saturation traffic flow rate of the inflow road j is "Sij", load ratio Lij is given by the following Equation (3).

$$Lij=(Vij+Qij)/Sij \quad (3)$$

Processing unit 51 of central apparatus 5 calculates load ratio Lri for phase i by the following Equation (4), and calculates load ratio Lrt for the entire intersection by the following Equation (5). In Equation (4), "maxj" means the maximum value of a j number of load ratios Lij included in phase i.

$$Lri=\max j(Lij) \quad (4)$$

$$Lrt=Lr1+Lr2 \quad (5)$$

Then, processing unit 51 of central apparatus 5 calculates a split λi and a cycle length C of phase i by the following Equations (6) and (7). In Equation (6), K represents a loss time, and a1 to a3 are coefficients.

$$\Lambda i=Lri/Lrt \quad (6)$$

$$C=(a1\times K+a2)/(1-a3\times Lrt) \quad (7)$$

The reflection of signal control parameter (step S4) is a process for causing second controller 6B of the intersection to be controlled to execute the signal control parameter calculated in step S3.

Specifically, processing unit 51 of central apparatus 5 calculates a signal control command including the switching timing of light color from the new signal control parameter, and transmits the calculated signal control command to second controller 6B. For second controller 6B that can calculate the switching timing of light color from the signal control parameter, the signal control parameter may be transmitted to second controller 6B as it is.

As described above, in the remote control according to the comparative example, traffic indices Lr and Ds are calculated by substituting the actually measured values of Vin, Qin, and Sf obtained from the detection signal of the vehicle detector into the definition equations (Equations (1) and (2)) of traffic indices Lr and Ds.

Thus, in the remote control according to the comparative example, there is a problem that the intersection to be controlled is limited to traffic signal controller 6 of an intersection where the vehicle detector is installed. Further, there is a fixed idea that a vehicle detector is required for remote control as long as the load ratio of MODERATO and phase saturations of SCOOT and SCATS are used.

As shown in Equations (1) and (2), in the definition equations of load ratio Lr and phase saturation Ds, the numerator includes Vin and Qin, and the denominator includes saturation traffic flow rate Sf.

Thus, when traffic volume Vin and the number of queuing vehicles Qin input to Equations (1) and (2) are each defined as a variable representing a ratio to saturation traffic flow rate Sf, load ratio Lr and phase saturation Ds can be calculated even when the true values of Vin, Qin, and Sf are unknown.

In other words, when the traffic volume of the inflow road is defined as Vin=α×Sf and the number of queuing vehicles is defined as Qin=β×Sf, and these are substituted into the Equations (1) and (2), Sf is canceled out by the numerator/denominator of the right side as shown in the following Equations (8) and (9). This means that as long as α and β can be determined, load ratio Lr and phase saturation Ds can be calculated even when an arbitrary value is used for saturation traffic flow rate Sf in the calculation process.

When traffic volume Vin (=α×Sf) normalized by Sf and the number of queuing vehicles Qin (=β×Sf) normalized by Sf are adopted, load ratio Lr and phase saturation Ds can be calculated without determining the values of Vin, Qin and Sf themselves.

$$\begin{aligned} Lr &= (Vin + k\times Qin)/Sf \\ &= (\alpha\times Sf + k\times\beta\times Sf)/Sf \\ &= \alpha + k\times\beta \end{aligned} \quad (8)$$

$$\begin{aligned} Ds &= Vin\times C/(Sf\times G) \\ &= \alpha\times Sf\times C/(Sf\times G) \\ &= \alpha\times C/G \end{aligned} \quad (9)$$

Hereinafter, traffic volume Vin (=α×Sf) and the number of queuing vehicles Qin (=β×Sf) that are each represented by a ratio to Sf are referred to as a "normalized traffic volume" and a "normalized number of queuing vehicles", respectively. "The normalized traffic volume" and "the normalized number of queuing vehicles" are collectively referred to as "normalized data". As described above, saturation traffic flow rate Sf in the present description can take any value.

On the other hand, as will be described later, when the calculation result of the probe information is used, the above-described α and β can be determined, and thus the signal control parameter can be calculated from load ratio Lr and phase saturation Ds without a vehicle detector.

Figure 5:
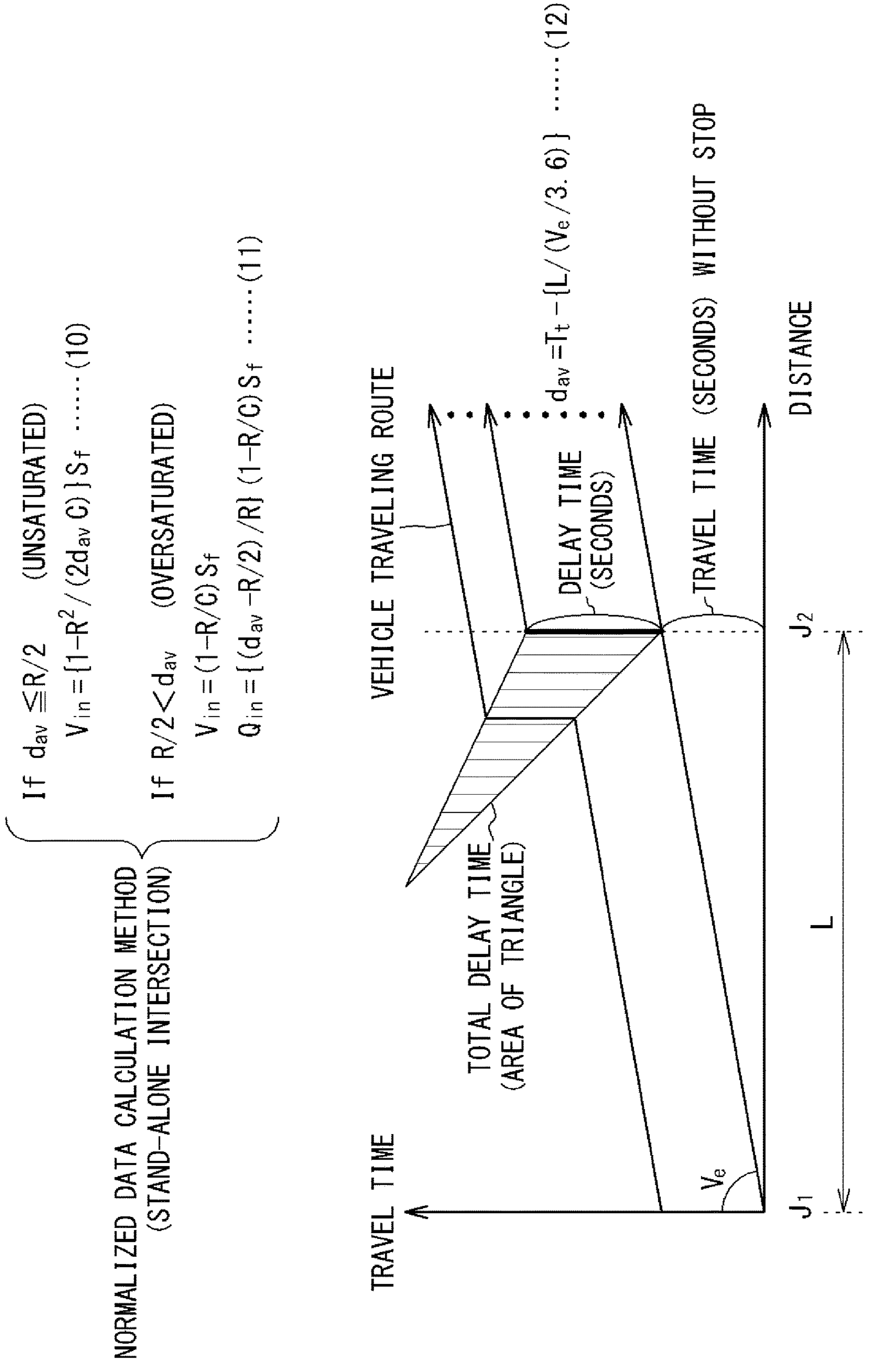
FIG. 5 is an explanatory diagram illustrating an example of a method for calculating normalized data when an intersection to be controlled by remote control is an stand-alone intersection.

In the present embodiment, normalized traffic volume Vin (=α×Sf) and normalized number of queuing vehicles Qin (=β×Sf) which can be calculated from probe information are adopted as traffic variables for an inflow road used for calculating a traffic index (see FIG. 5).

Figure 4:
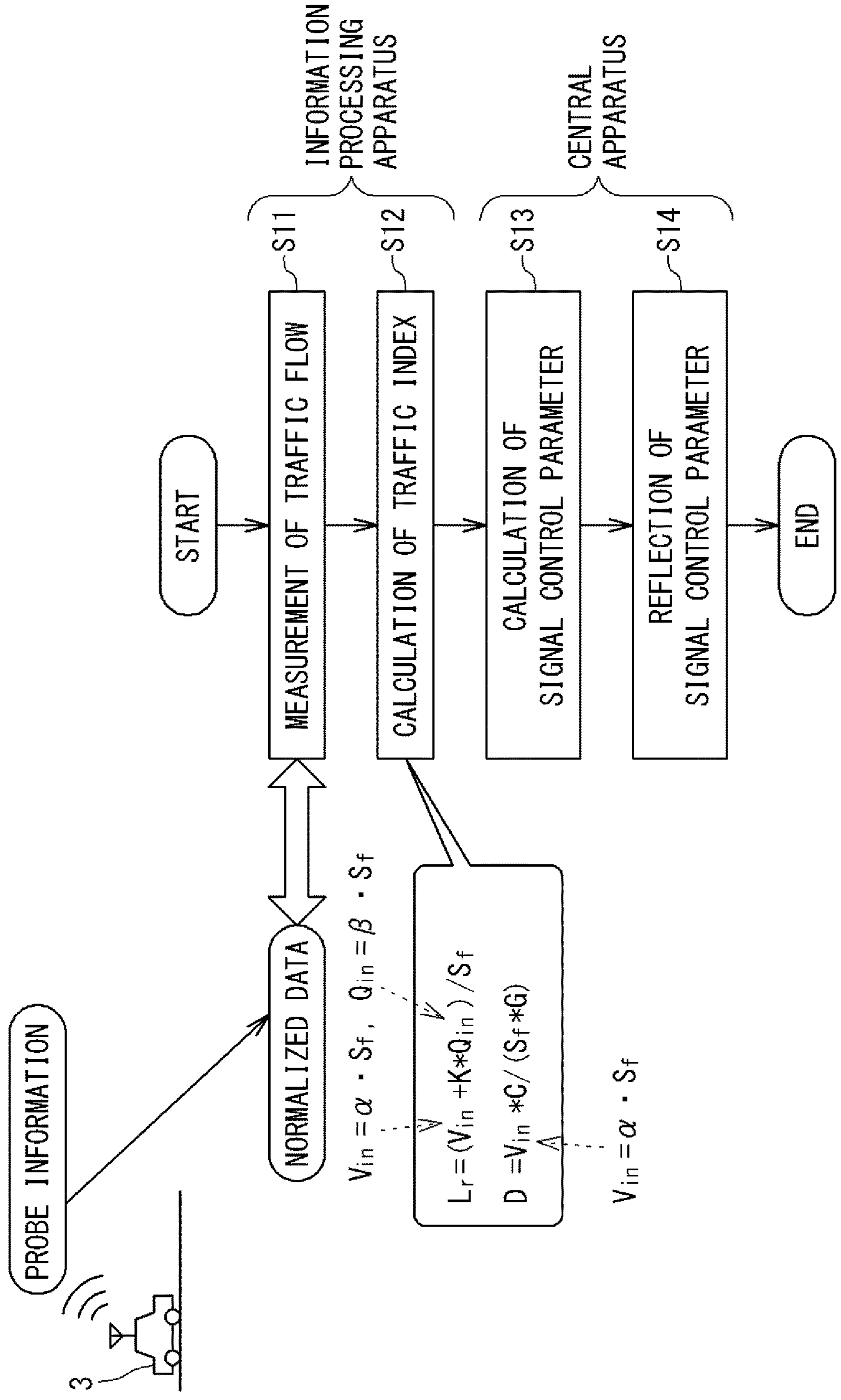
FIG. 4 is a flowchart illustrating an overview of remote control according to the present embodiment.

As described above, calculating the traffic index used for calculating the signal control parameter by using the normalized data obtained from, for example, the probe information allows the remote control to be executed even when the vehicle detector is not installed. With reference to FIG. 4, an overview of the remote control in the present embodiment will be described below.

Overview of Remote Control in Present Embodiment

FIG. 4 is a flowchart illustrating an overview of the remote control (traffic adaptive control) according to the present embodiment.

As illustrated in FIG. 4, the remote control in the present embodiment includes "measurement of traffic flow" (step S11), "calculation of traffic index" (step S12), "calculation of signal control parameter" (step S13), and "reflection of signal control parameter" (step S14).

Processing unit 11 of information processing apparatus 2 repeatedly executes each process of steps S11 to S12 every predetermined control period (for example, 1.0 to 2.5 minutes).

Processing unit 51 of central apparatus 5 repeatedly executes each process of steps S13 to S14 every same control period (for example, 1.0 to 2.5 minutes).

The measurement of traffic flow (step S11) is a process for measuring a traffic flow for each inflow road at an intersection to be controlled. The measurement of traffic flow in the present embodiment is a process for calculating normalized data using probe information as source data.

The normalized data includes normalized traffic volume Vin (=α×Sf) representing a ratio to Sf and normalized number of queuing vehicles Qin (=β×Sf) representing a ratio to Sf.

The calculation of traffic index (step S12) is a process for calculating a traffic index for each inflow road necessary for calculating the signal control parameter by using the measurement result in step S11.

Load ratio Lr is calculated by Equation (1) described above. Phase saturation Ds is calculated by Equation (2) described above.

Processing unit 11 of information processing apparatus 2 substitutes the normalized data Vin (=α×Sf) and Qin (=β×Sf) obtained in step 11 into Equation (1) or (2) to calculate at least one traffic index of load ratio Lr or phase saturation Ds.

In this case, as is clear from the above-described Equations (8) and (9), since Sf is canceled out by the numerator/denominator of the right side, even when the values of Vin, Qin, and Sf themselves are unknown, load ratio Lr and phase saturation Ds can be calculated.

Processing unit 11 of information processing apparatus 2 transmits the calculation result of load ratio Lr or phase saturation Ds obtained in step S13 to central apparatus 5.

Upon receiving the calculation result of load ratio Lr or phase saturation Ds from information processing apparatus 2, processing unit 51 of central apparatus 5 executes the calculation processes of steps S13 and S14 using the received calculation result.

The calculation of signal control parameter (step S13) is a process for calculating the signal control parameter such as a split and a cycle length of the intersection to be controlled using the traffic index received from information processing apparatus 2. The processing content in step 13 are the same as in step S3 in FIG. 3.

The reflection of signal control parameter (step S14) is a process for causing second controller 6B of the intersection to be controlled to execute the signal control parameter calculated in step S13. The processing contents in step 14 is the same as in step S4 in FIG. 3.

Method for Calculating Normalized Data for Stand-Alone Intersection

FIG. 5 is an explanatory diagram illustrating an example of a method for calculating normalized data when an intersection to be controlled by remote control is an stand-alone intersection. The meanings of variables included in FIG. 5 are as follows.

The "stand-alone intersection" is an intersection to be controlled by the remote control and is an intersection to be controlled alone, independently of other intersections.

- dav: Delay time (average value) (seconds) per vehicle due to waiting at a traffic signal
- L: Link length (m) between intersections
- Tt: Average travel time (seconds) of the probe vehicle (=link travel time between J1 and J2),
- Ve: Expected speed (for example, a regulatory speed) (km/h)
- J1: Intersection upstream of the intersection to be controlled
- J2: Intersection (stand-alone intersection) to be controlled by remote control As illustrated in FIG. 5, for remote control of the stand-alone intersection, processing unit 11 of information processing apparatus 2 calculates normalized traffic volume Vin and normalized number of queuing vehicles Qin using the following Equation (10) or (11) depending on the saturation state (unsaturated or oversaturated state) of the intersection. In Equations (10) and (11), "R" is a red interval (seconds).

If dav≤R/2 (unsaturated case)

$$Vin=\{1-R^2/(2\times dav\times C)\}\times Sf \tag{10}$$

If R/2<dav (oversaturated case)

$$Vin=(1-R/C)\times Sf$$

$$Qin=\{(dav-R/2)/R\}\times(1-R/C)\times Sf \tag{11}$$

Hereinafter, with reference to FIGS. 5 to 7, the rationale for the validity of Equation (10) and Equation (11) will be described.

Relationship Between Link Travel Time and Delay Time

The graph in the lower part of FIG. 5 is a graph illustrating a traveling route when a plurality of vehicles passes through a link between intersections J1 and J2. The horizontal axis of the graph represents a distance from intersection J1, and the vertical axis of the graph represents a travel time.

When the plurality of vehicles passes through the link between intersections J1 and J2, delay time dav per vehicle due to waiting at a traffic signal is a value obtained by dividing the total delay time (area of the triangle) of all vehicles passing through intersection J2 after waiting at the traffic signal by the number of vehicles.

It can be considered that average travel time Tt of the plurality of probe vehicles 3 includes the above-described delay time dav per vehicle.

Thus, delay time dav per vehicle due to waiting at a traffic signal is a time obtained by subtracting a travel time (=L/(Ve/3.6)) when the link is traveled at expected speed Ve without waiting at a traffic signal from average travel time Tt of the plurality of probe vehicles 3. That is, delay time dav can be defined by the following Equation (12).

$$Dav=Tt-\{L/(Ve/3.6)\} \tag{12}$$

Processing unit 11 of information processing apparatus 2 extracts the probe information of the plurality of probe vehicles 3 that has passed through the link between intersections J1 and J2 during the current control period (for example, 1.0 to 2.5 minutes) from the position and time of the probe information included in probe database 22.

Then, processing unit 11 calculates average travel time Tt over the link by probe vehicle 3 based on the position and time (speed may also be used) of a plurality of pieces of the extracted probe information, and substitutes the calculated Tt into the Equation (12) to obtain delay time dav.

Case of Unsaturated Stand-Alone Intersection

Figure 6:
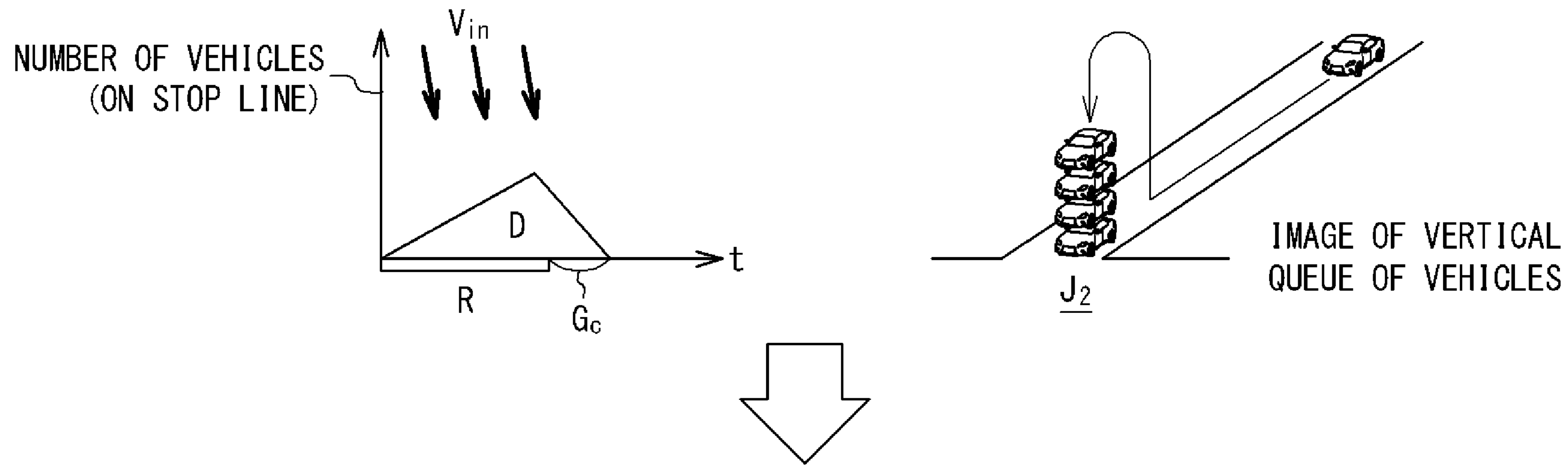
FIG. 6 is an explanatory diagram illustrating a traffic situation of an intersection in an unsaturated state and a relational equation necessary for deriving a traffic volume Vin normalized by Sf.

FIG. 6 is an explanatory diagram illustrating the traffic situation of intersection J2 in an unsaturated state and the relational expressions necessary for deriving traffic volume Vin normalized by Sf.

In the example of FIG. 6, it is assumed that vehicles stopped before intersection J2 stop so as to overlap at the same position immediately before a stop line (an image of vertical queue of vehicles). In FIG. 6, "D" is a total delay time (seconds) during one cycle, and "Gc" is the time (seconds) from a start time point of green light as the origin, and represents the time at which a tail-end vehicle passes through the stop line of intersection J2.

When an inflow road at intersection J2 is unsaturated ($dav \le R/2$), the number of vehicles ($=(R+Gc)\times Vin$) entering after the start of red light is equal to the number of vehicles ($=Gc\times Sf$) entering by time Gc. Therefore, time Gc when the tail-end vehicle passes the stop line is expressed by the following Equation (13).

$$Gc = Vin \times R/(Sf - Vin) \quad (13)$$

Total delay time D of the line of vehicles during one cycle and delay time dav per vehicle are calculated by the following Equations (14) and (15), respectively.

$$D = 0.5 \times \{(R+Gc) \times R \times Vin\} \quad (14)$$

$$dav = D/(C \times Vin) = 0.5 \times \{(R+Gc) \times R\}/C \quad (15)$$

Substituting Gc in Equation (13) into Equation (15) and solving Vin, normalized traffic volume Vin for unsaturated intersection J2 is calculated by Equation (10) described above.

Case of Oversaturated Stand-Alone Intersection

Figure 7:
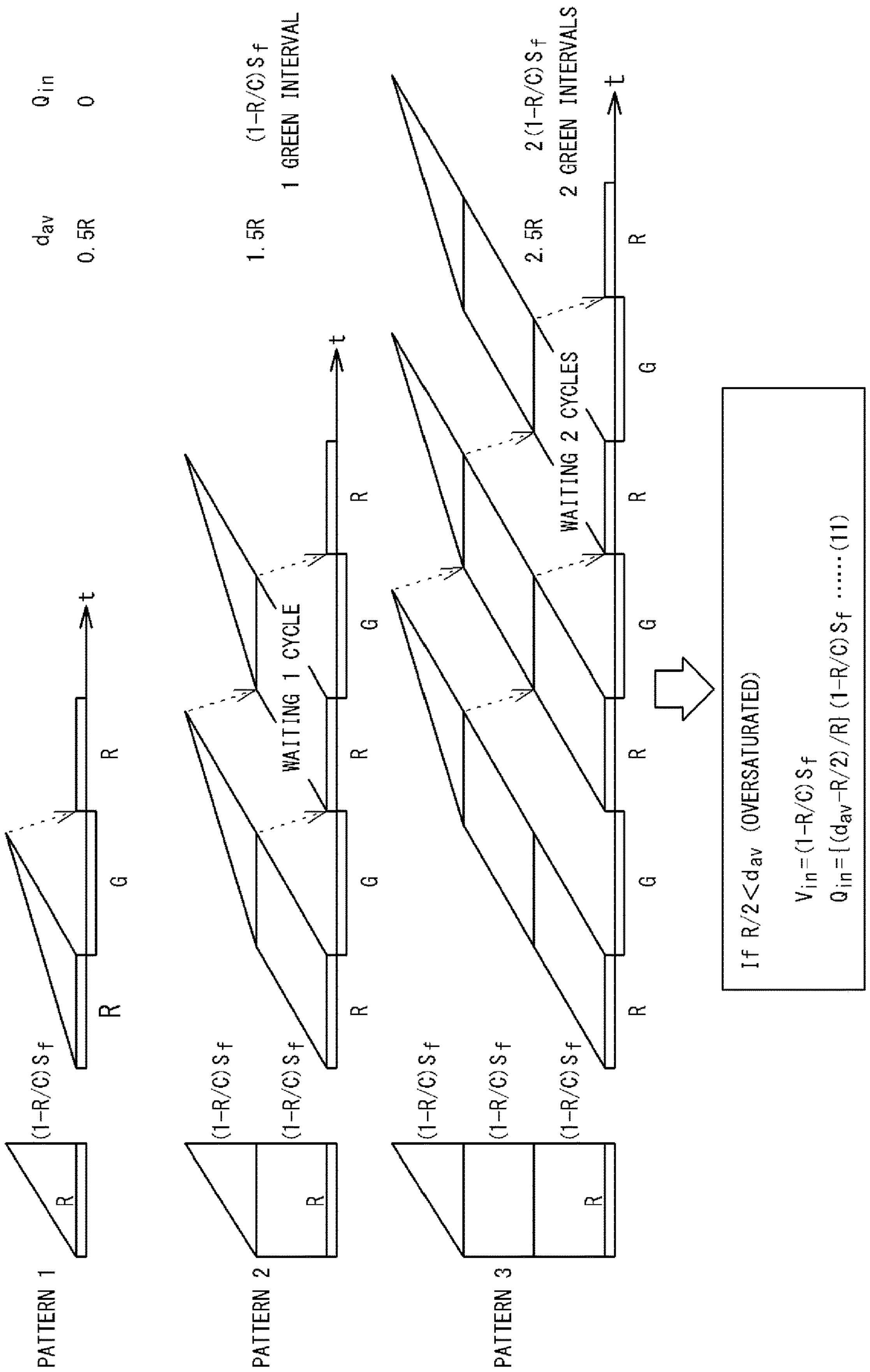
FIG. 7 is an explanatory diagram illustrating an example of a traffic situation of an intersection in an oversaturated state.

FIG. 7 is an explanatory diagram illustrating an example of a traffic situation of intersection J2 in an oversaturated state.

As illustrated in FIG. 7, a simple model of only running and stopping is considered as a model representing an oversaturated state in which a vehicle waiting at a traffic signal two or more times is included. In this case, for the second and subsequent stops due to waiting at a traffic signal, the stop time per stop is equal to red interval R.

Pattern 1 in FIG. 7 illustrates a traffic situation when the queue is processed during the current cycle (waiting 0 cycle), that is, when intersection J2 is just in a saturated state.

Pattern 2 in FIG. 7 illustrates a traffic situation when the queue is processed during the next cycle (waiting one cycle), and pattern 3 in FIG. 7 illustrates a traffic situation when the queue is processed during the cycle after the next cycle (waiting two cycles).

In pattern 1, $dav=0.5R$ and $Qin=0$

In pattern 2, $dav=1.5R$ and $Qin=(1-R/C)\times Sf$

In pattern 3, $dav=2.5R$ and $Qin=2\times(1-R/C)\times Sf$

Thus, when intersection J2 is in the oversaturated state, normalized traffic volume Vin and normalized queue Qin are calculated by Equation (11) described above.

Problem with Using Average Travel Time Over Link

Figure 8:
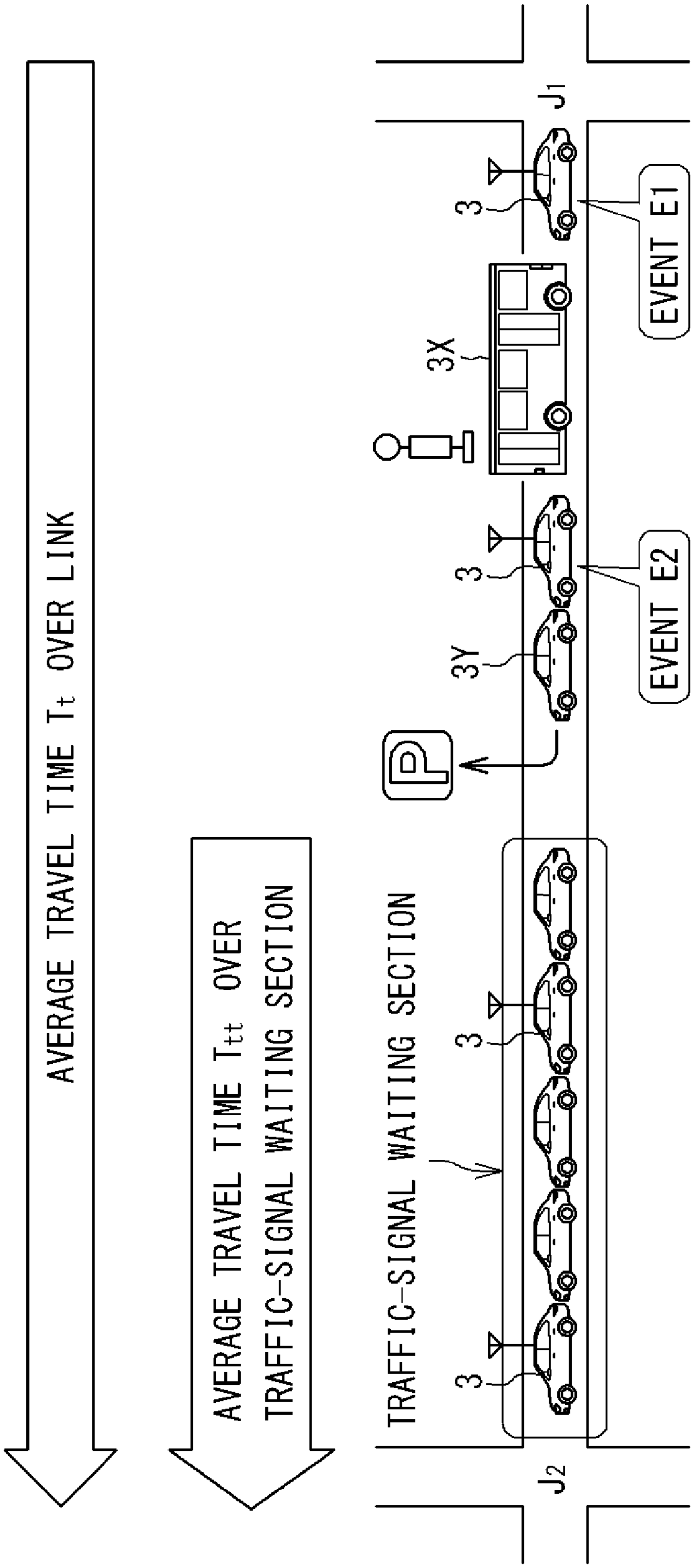
FIG. 8 is an explanatory diagram illustrating an example of a stop event that affects an accuracy of delay time per vehicle due to waiting at a traffic signal.

FIG. 8 is an explanatory diagram illustrating an example of a stop event that affects the accuracy of delay time dav per vehicle due to waiting at a traffic signal.

As illustrated in FIG. 8, as a stop event that can occur when probe vehicle 3 passes through the link from intersection J1 to intersection J2, in addition to waiting at a traffic signal at intersection J2, for example, the following events E1 and E2 are considered.

Event E1: Stop due to becoming the following vehicle of bus 3X stopped at the bus stop Event E2: Stop due to becoming the following vehicle of another vehicle 3Y entering or exiting a parking lot However, in the above Equation (12), the link travel time between intersections J1 and J2 is adopted as average travel time Tt obtained from the probe information.

Therefore, when events E1 and E2 have occurred in probe vehicle 3, average travel time Tt includes the stop time of events E1 and E2, and thus delay time dav based on Equation (12) becomes longer than the actual delay time.

In this case, normalized traffic volume Vin and normalized queue Qin using delay time dav as source data become inaccurate, and load ratio Lr and phase saturation Ds using normalized traffic volume Vin and normalized queue Qin as source data also become inaccurate.

Therefore, the accuracy of the signal control parameter calculated from load ratio Lr and phase saturation Ds may be reduced.

Solving Method by Using Average Travel Time Over Traffic-Signal Waiting Section In the present embodiment, in order to solve the above problem, an "average travel time Ttt over a traffic-signal waiting section" (see Equation (16)) of the inflow road at intersection J2 is calculated instead of "average travel time Tt over link" which may include the stop time of events E1 and E2 other than waiting at a traffic signal, and delay time dav per vehicle due to the waiting at a traffic signal on the inflow road at intersection J2 is calculated using average travel time Ttt (see Equation (17)).

Average travel time Ttt over the traffic-signal waiting section does not include the stop time of events E1 and E2 other than the waiting at a traffic signal, or there is an extremely small possibility of including the stop time.

Therefore, when the above calculation method is adopted, it is possible to accurately calculate delay time dav per vehicle due to the waiting at a traffic signal on the inflow road entering intersection J2 regardless of the presence or absence of stopping events other than the waiting at a traffic signal such as events E1 and E2.

Figure 9:
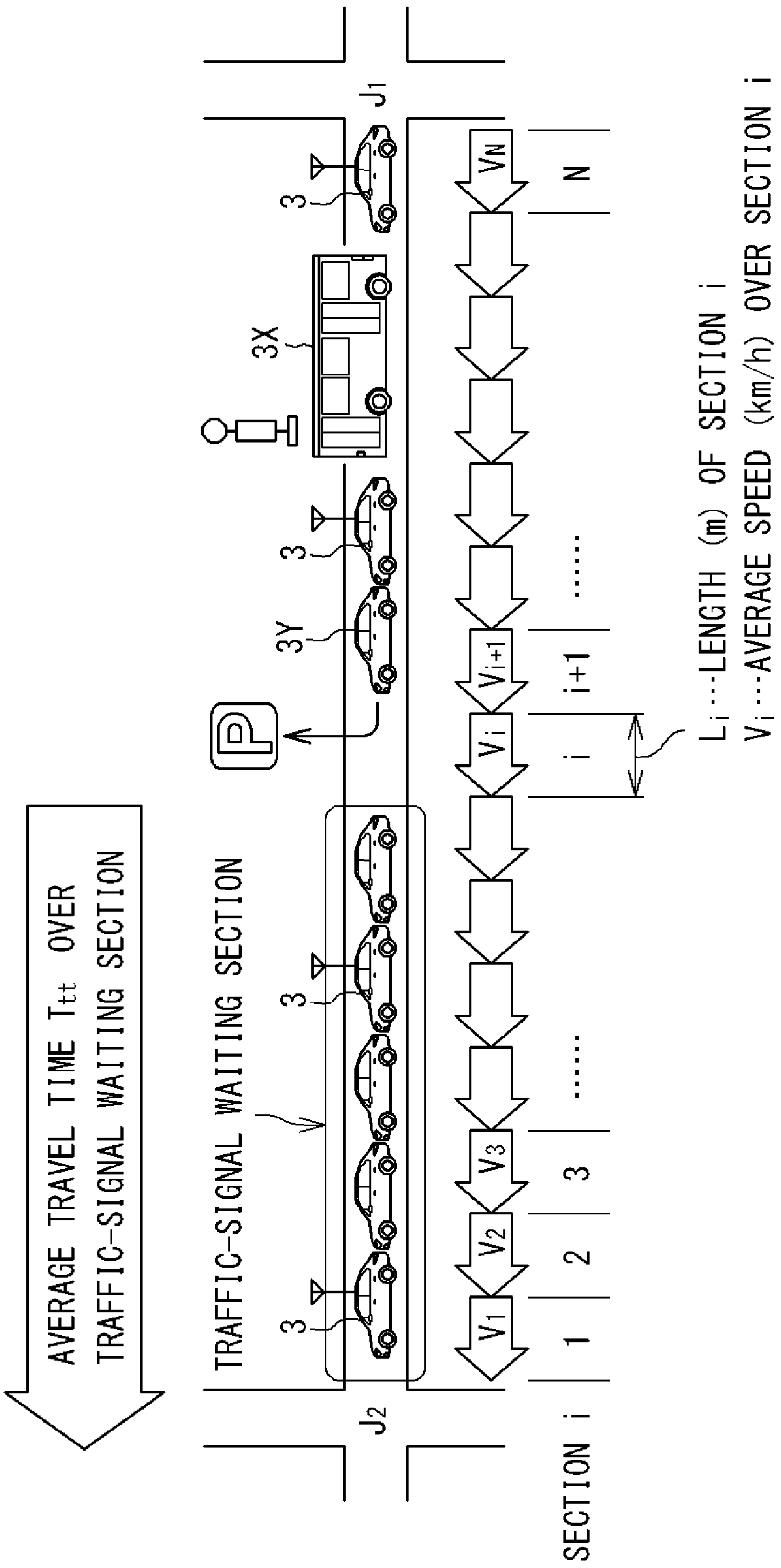
FIG. 9 is an explanatory diagram illustrating an example of definition of variables used for calculating an average travel time over a traffic-signal waiting section.

FIG. 9 is an explanatory diagram illustrating an example of the definition of variables used for calculating average travel time Ttt over the traffic-signal waiting section. The variables include a section i (i=1, 2, . . . , N), a length Li (m) of section i, and an average speed Vi (km/h) of probe vehicle 3 passing through section i.

Section i includes a plurality of small sections obtained by dividing the link between intersections J1 and J2 with a predetermined number N of divisions. Length Li of section i (hereinafter, also referred to as a "section length") is a calculated value or a set value determined to be sufficiently shorter than a link length L between intersections J1 and J2.

Processing unit 11 of information processing apparatus 2 executes the following processes a1 and a2 as preprocessing of the calculation process (see FIG. 10) for calculating delay time dav.

Process a1: Setting a value (=L/N) obtained by dividing link length L by the number of divisions N to section length Li.

Process a2: Assigning an identification number (i=1, 2, . . . , N) for each section i in order from downstream to upstream of the link. Specifically, the identification number on the most downstream side is set to "1", the identification number is incremented toward the upstream side, and the last identification number is set to "N".

Processing unit 11 of information processing apparatus 2 may execute the following processes b1 and b2 as preprocessing of the calculation process (see FIG. 10) for calculating delay time dav.

Process b1: Setting a value (=M+1) obtained by adding 1 to a quotient M which is obtained by dividing link length L by a predetermined distance Lo to the number of divisions N of the link, and setting the remainder of the distance value to section length LN of the last section N.

Process b2: Assigning an identification number (i=1, 2, . . . , N) for each section i in order from downstream to upstream of the link. Specifically, process b2 is the same as process a2.

In the preprocessing described above, when the link between intersections J1 and J2 has a branch node such as an unsignalized intersection, section i may be divided at the branch node.

Section length Li of each section i (i=1, 2, . . . , N) included in the link does not have to be a constant distance, and section length Li included in one link may be varied, such as shortening the downstream portion of the link and lengthening the upstream portion of the link.

In the pre-processing, each length (section length) Li of the plurality of sections i may be set to a value smaller than an installation interval (for example, 200 m) at which vehicle detectors each configured to measure a vehicle speed are actually installed on a road.

In this manner, the measurement granularity of the average speed of the vehicle becomes finer than when the average speed of the vehicle is measured by the vehicle detector. This allows the traffic-signal waiting section determined according to the total number of sections I to be calculated more finely, and the calculation accuracy of delay time dav to be improved.

The average speed (hereinafter, also referred to as a "section speed") Vi of probe vehicles 3 over section i is an average speed of probe vehicles 3 calculated from the positions and times of a plurality of pieces of probe information. A method for calculating average speed Vi over each section i will be described later.

Calculation Process for Delay Time

Figure 10:
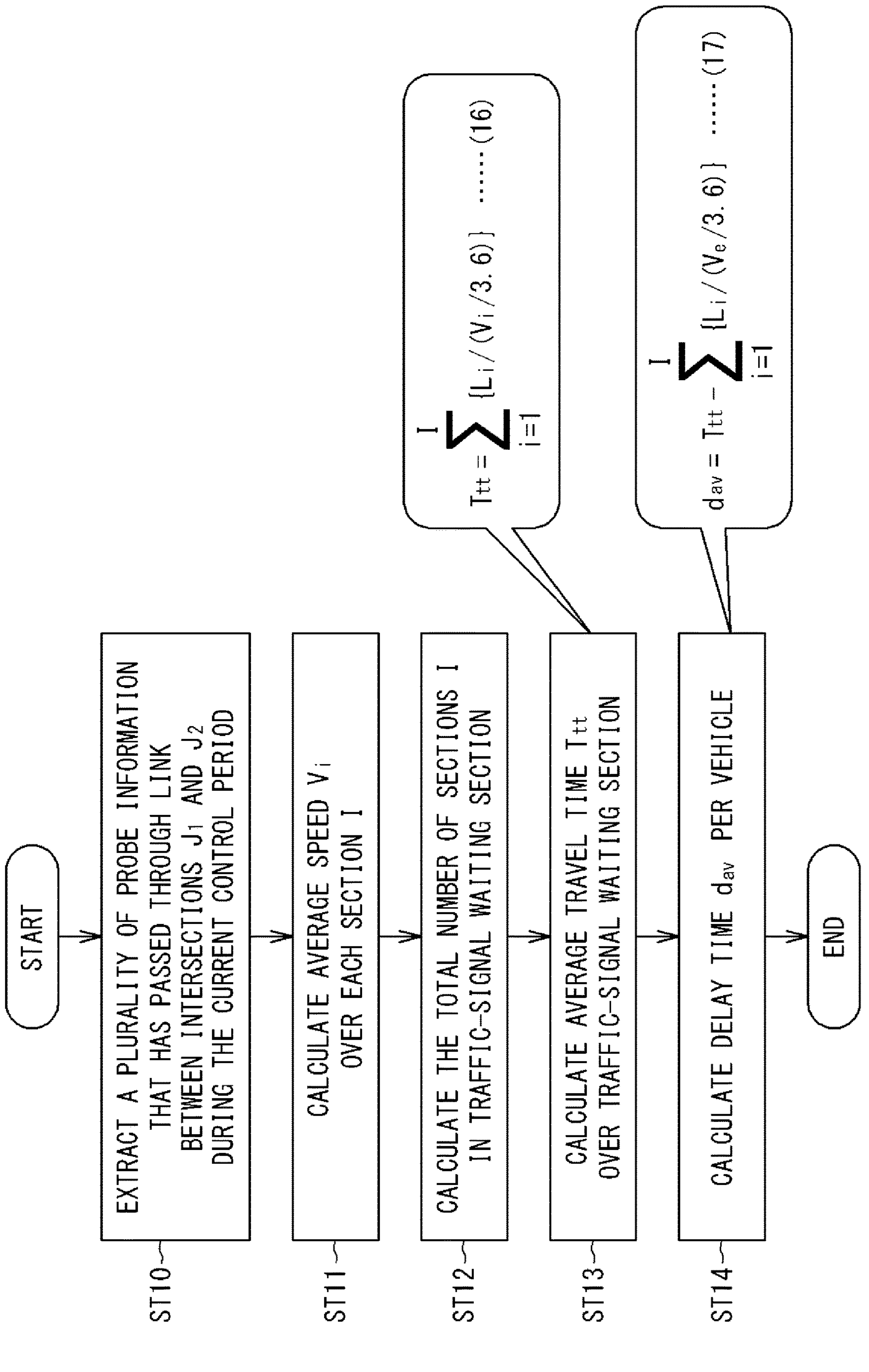
FIG. 10 is a flowchart illustrating an example of a calculation process for calculating delay time per vehicle due to waiting at a traffic signal.

FIG. 10 is a flowchart illustrating an example of a calculation process for calculating delay time dav per vehicle due to waiting at a traffic signal executed by processing unit 11 of information processing apparatus 2.

As illustrated in FIG. 10, for collecting data necessary to calculate delay time dav, processing unit 11 of information processing apparatus 2 first extracts probe information of a plurality of probe vehicles 3 that have passed through the link between intersections J1 and J2 during the current control cycle (for example, 1.0 to 2.5 minutes) from the positions and times of the probe information included in probe database 22 (step ST10).

Next, processing unit 11 calculates average speed Vi over each section i (i=1, 2, . . . N) included in the link as the first process of the calculation process for calculating delay time dav (step ST11).

Specifically, processing unit 11 calculated a travel speed over section i based on the position and time (speed may be also used) included in the probe information for each probe vehicle 3 that has passed through the link. Subsequently, processing unit 11 sets a value obtained by dividing the total value of the traffic speeds of respective probe vehicles 3 over section i by the number of probe vehicles 3 to an average speed Vi over the section i.

Next, processing unit 11 calculates the total number of sections I in the traffic-signal waiting section of the inflow road at intersection J2 to be controlled as the second process of the calculation process for calculating delay time dav (step ST12).

The total number of sections I corresponds to the identification number of section i located on most upstream of the traffic-signal waiting section of the inflow road at intersection J2 to be controlled. The calculation process for calculating the total number of sections I (see FIG. 11) will be described in detail below.

Next, processing unit 11 calculates average travel time Ttt over the traffic-signal waiting section by using the calculated total number of sections I as the third process of the calculation process for calculating delay time dav (step ST13). Specifically, processing unit 11 obtains average travel time Ttt using the following Equation (16).

As illustrated in Equation (16), average travel time Ttt over the traffic-signal waiting section is the total time of the average travel times (=Li/(Vi/3.6)) of probe vehicles 3 over respective sections i from section 1 to section I (where I is the total number of sections).

[Math. 3]

$$Ttt = \sum_{i=1}^{I} \{Li/(Vi/3.6)\} \tag{16}$$

Finally, processing unit 11 calculates delay time dav per vehicle due to the waiting at a traffic signal in the traffic-signal waiting section using the calculated total number of sections I and average travel time Ttt as the fourth process of the calculation process for calculating delay time dav (step ST14). Specifically, processing unit 11 obtains delay time dav using the following Equation (17).

As illustrated in Equation (17), delay time dav over the traffic-signal waiting section is a time obtained by subtracting, from average travel time Ttt over the traffic-signal waiting section, the travel time (=Σ(Li/(Ve/3.6)) when the traffic-signal waiting section (from section 1 to section I) is traveled at expected speed Ve without waiting at a traffic signal.

[Math. 4]

$$dav = Ttt - \sum_{i=1}^{I} \{Li/(Ve/3.6)\} \tag{17}$$

In the calculation process for calculating delay time dav in FIG. 10, the third process of step ST13 and the fourth process of step 14 may be executed using a single equation obtained by substituting Equation (16) for Ttt on the right side of Equation (17).

Figure 11:
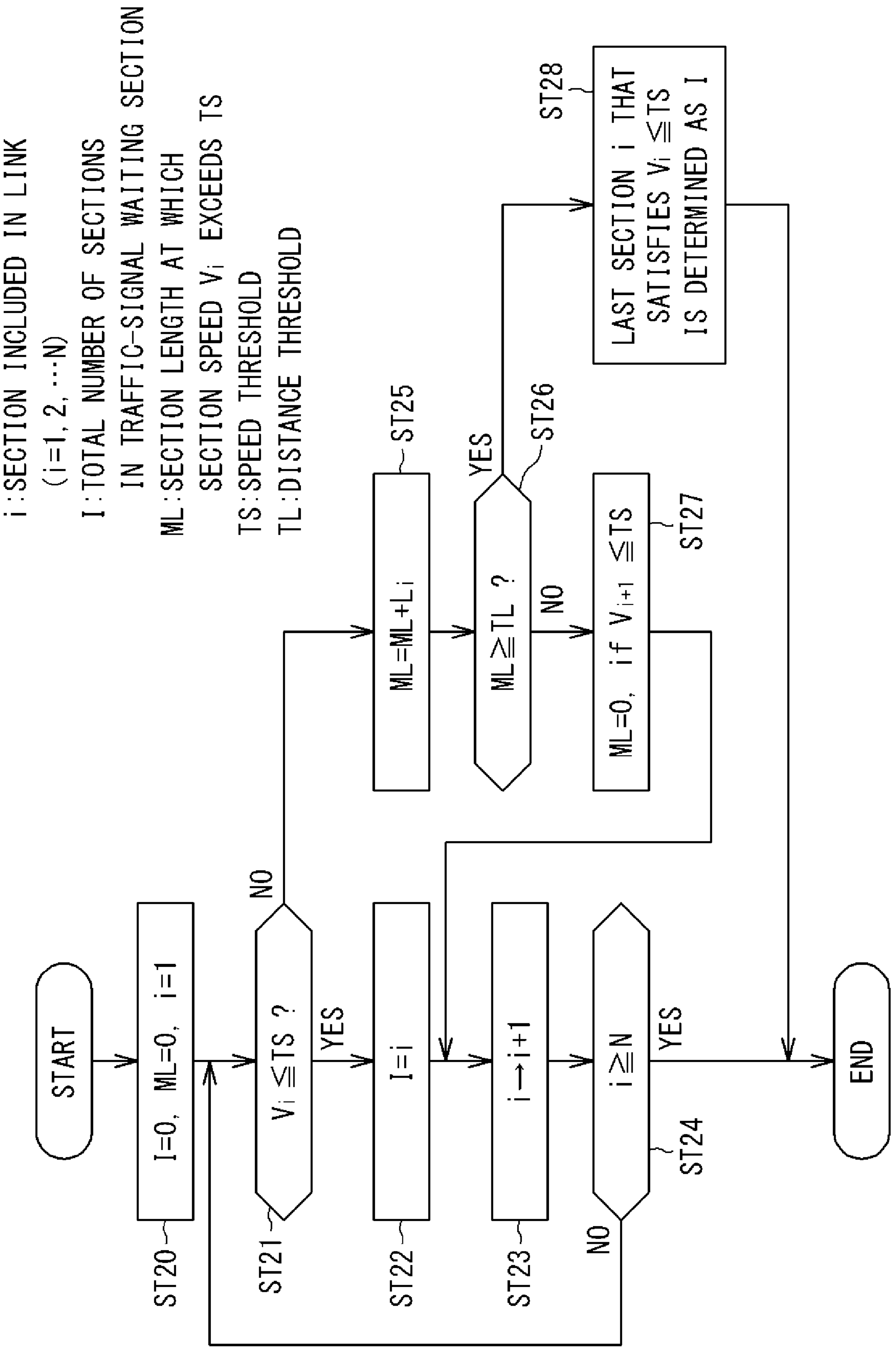
FIG. 11 is a flowchart illustrating an example of a calculation process for calculating a total number of sections in a traffic-signal waiting section.

Calculation Process for Total Number of Sections in Traffic-Signal Waiting Section FIG. 11 is a flowchart illustrating an example of a calculation process for calculating the total number of sections I in the traffic-signal waiting section, which is executed by processing unit 11 of information processing apparatus 2.

In FIG. 11, "ML" is a variable representing a section length at which section speed Vi exceeds a speed threshold TS. "TS" represents a speed threshold, and "TL" represents a distance threshold.

Speed threshold TS is an estimated value of the average speed of a vehicle when the vehicle stops before intersection J2 due to waiting at a traffic signal. Speed threshold TS is a set value determined according to, for example, the size of section length Li. In the present embodiment, speed threshold TS is set to 25 km/h.

Distance threshold TL is an estimated value of the cruising distance when a vehicle traveling at an average speed exceeding speed threshold TS continues traveling without intention to stop. Distance threshold TL is a set value determined according to, for example, the magnitude of speed threshold TS. In the present embodiment, distance threshold TL is set to 100 m.

As illustrated in FIG. 11, processing unit 11 of information processing apparatus 2 first initializes variables (step ST20). Specifically, processing unit 11 sets initial values of the total number of sections I, section length ML (length obtained by adding the respective section lengths Li), and section i to I=0, ML=0, and i=1, respectively.

Next, processing unit 11 determines whether or not Vi≤TS is satisfied (step ST21).

When the determination result of step ST21 is positive (when section speed Vi over section i under determination is equal to or less than speed threshold TS), processing unit 11 sets I=i (step ST22) and then increments section i (step ST23).

Next, processing unit 11 determines whether or not i≥N is satisfied (step ST24).

When the determination result of step ST24 is positive, processing unit 11 ends the process.

When the determination result of step ST24 is negative, processing unit 11 returns the process to step ST21.

Through a loop including steps ST21 to ST24, a search process for searching for, in order from downstream to upstream of the inflow road, a section i satisfying the speed condition in which section speed Vi is less than or equal to speed threshold TS, and counting a section satisfying the speed condition is counted as section i included in the traffic-signal waiting section is executed.

When the determination result of step ST21 is negative (when section speed Vi over section i under determination exceeds speed threshold TS), processing unit 11 adds section length Li of section i under determination to variable ML (step ST25), and then determines whether or not ML≥TL is satisfied (step ST26).

When the determination result of step ST26 is negative (when variable ML is less than distance threshold TL), processing unit 11 resets variable ML to 0 on condition that Vi+1≤TS is satisfied (step ST27), and returns the process to step ST23.

Therefore, when Vi+1>TS, the value of variable ML is maintained without being reset, and the process is returned to step ST23.

The reason why variable ML is reset to 0 when Vi+1≤TS is satisfied is that it is clear that variable ML does not increase in the next section i+1 when section speed Vi+1 of the next section i+1 is less than or equal to speed threshold TS.

When the determination result of step ST26 is positive (when variable ML is greater than or equal to distance threshold TL), processing unit 11 determines the identification number value of the last section i satisfying Vi≤TS as the total number of sections I in the traffic-signal waiting section (step ST28), and ends the process.

Figure 12:
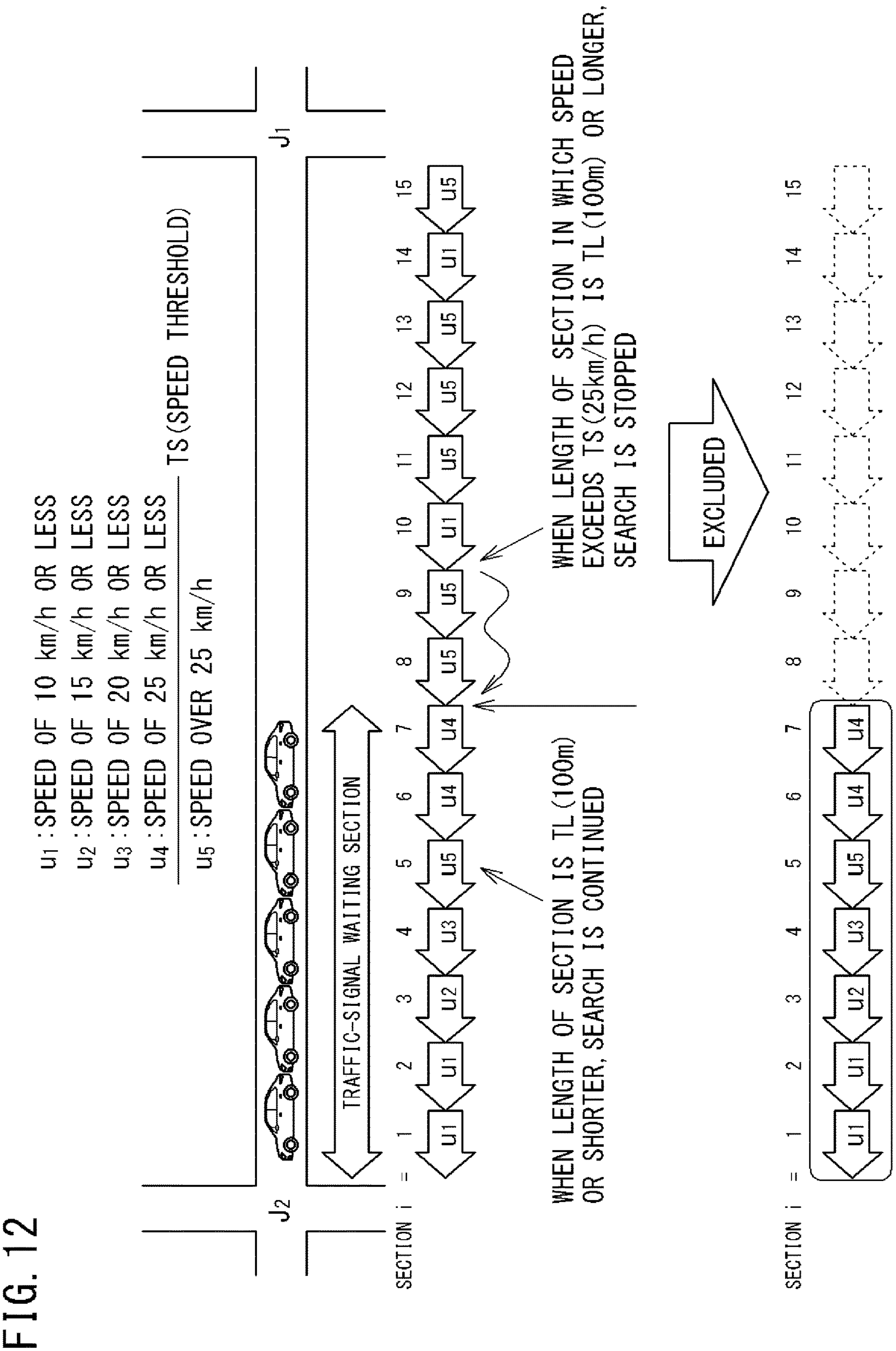
FIG. 12 is an explanatory diagram illustrating an actual example of calculating a total number of sections.

Example of Calculating Total Number of Sections in Traffic-Signal Waiting Section FIG. 12 is an explanatory diagram illustrating an actual example of calculating the total number of sections I.

In FIG. 12, numerical values from "u1" to "u5" are actually measured values of section speed Vi obtained from probe information of a plurality of probe vehicles 3, and are the following numerical values, respectively. In addition, the number of divisions N of the link is 15, section length Li of each section i is 50 m, TS is 25 km/h, and TL is 100 m.

u1=a speed of 10 km/h or less
u2=a speed of 15 km/h or less
u3=a speed of 20 km/h or less
u4=a speed of 25 km/h or less
u5=a speed over 25 km/h As illustrated in FIG. 12, section speeds V1 and V2 (=u1) are less than or equal to speed threshold TS, and section speeds V3 and V4 (=u3) are also less than or equal to speed threshold TS. Therefore, the total number of sections I is counted up to "4" through the loop of steps ST21 to ST24 in FIG. 11.

Since section speed V5 (=u5) exceeds speed threshold TS (No in step ST21 of FIG. 11), the process exits the loop of steps ST21 to ST24 in FIG. 11, and variable ML is set to L5 (step ST25 in FIG. 11).

Since the value of variable ML (L5=50 m) is less than distance threshold TL (=100 m) and section speed V6 (=u4) of the next section 6 is less than speed threshold TS (No in step ST26 of FIG. 11), ML is reset to 0 and the search for the total number of sections I is continued (step ST27 in FIG. 11). Therefore, the total number of sections I is counted up to "5".

Section speeds V6 and V7 (=u4) are less than or equal to speed threshold TS. Thus, the total number of sections I is counted up to "7" through the loop of steps ST21 to ST24 in FIG. 11.

Since section speed V8 (=u5) exceeds speed threshold TS (No in step ST21 of FIG. 11), the process exits the loop of steps ST21 to ST24 in FIG. 11, and variable ML is set to L8 (step ST25 of FIG. 11).

Since the value of variable ML (L8=50 m) is less than distance threshold TL (=100 m) and section speed V9 (=u5) of the next section 9 is greater than or equal to speed threshold TS (No in step ST26 of FIG. 11), the search for the total number of sections I is continued while maintaining ML=L8 (step ST27 of FIG. 11). Therefore, the total number of sections I is counted up to "8".

Since section speed V9 (=u5) exceeds speed threshold TS (No in step ST21 of FIG. 11), the process exits the loop of steps ST21 to ST24 in FIG. 11, and variable ML is set to L8+L9 (step ST25 in FIG. 11).

Since the value of variable ML (L8+L9=100 m) is greater than or equal to distance threshold TL (=100 m) (Yes in step ST26 of FIG. 11), the last section i (=7) that satisfies Vi≤TS is determined as the value of the total number of sections I (step ST28 in FIG. 11), and the process ends.

In this case, the most upstream end of the last section i (=7) is regarded as the end of the traffic-signal waiting section. Accordingly, speeds Vi and section lengths Li over sections 8 to 15 on the upstream side of section 7 are excluded from the data for calculating average travel time Ttt.

Method for Calculating Delay Time for Multiple-Lanes Case

Figure 13:
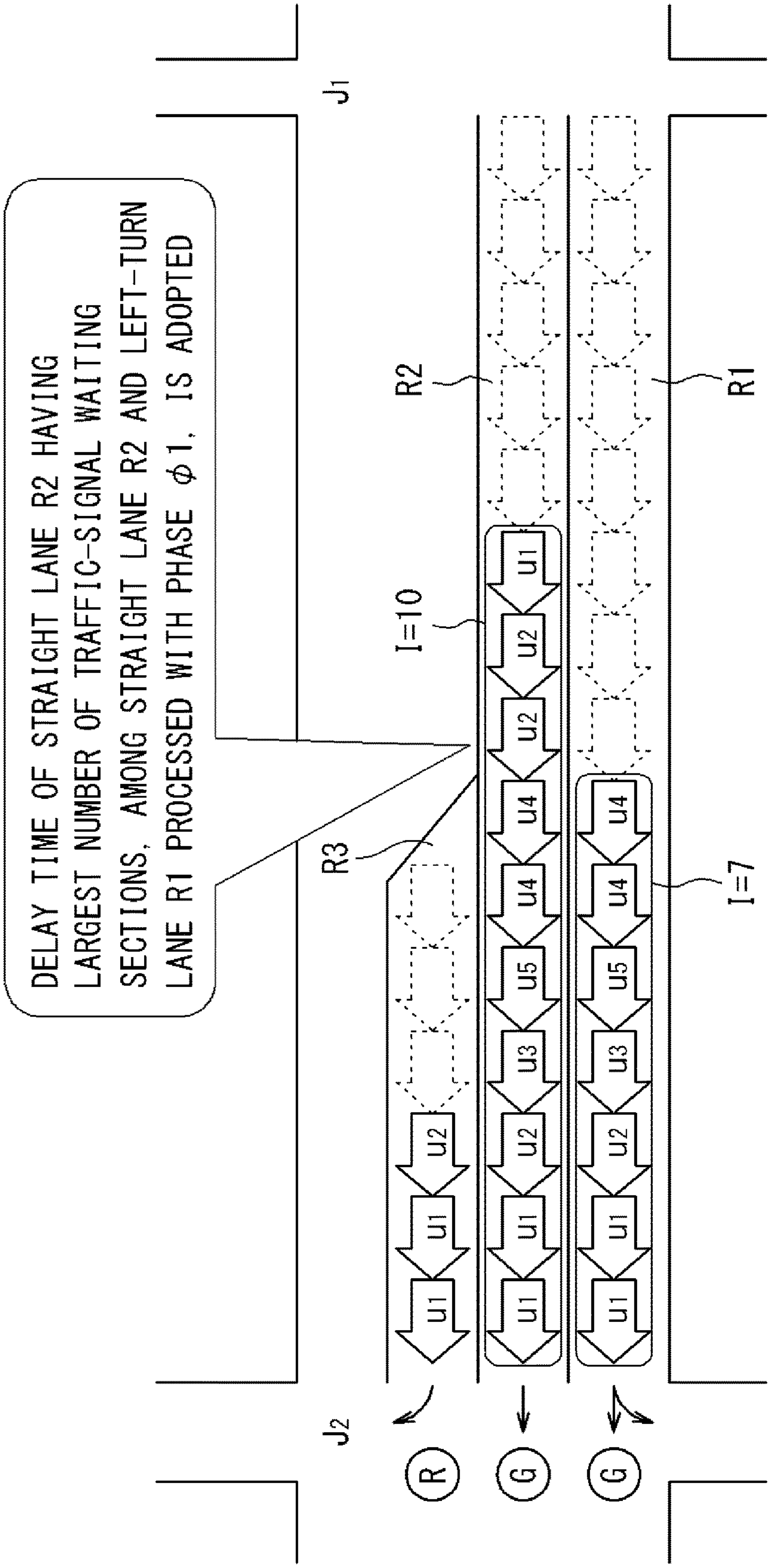
FIG. 13 is an explanatory diagram illustrating an example of a method for calculating a delay time when a link between intersections has a plurality of lanes.
Figure 14:
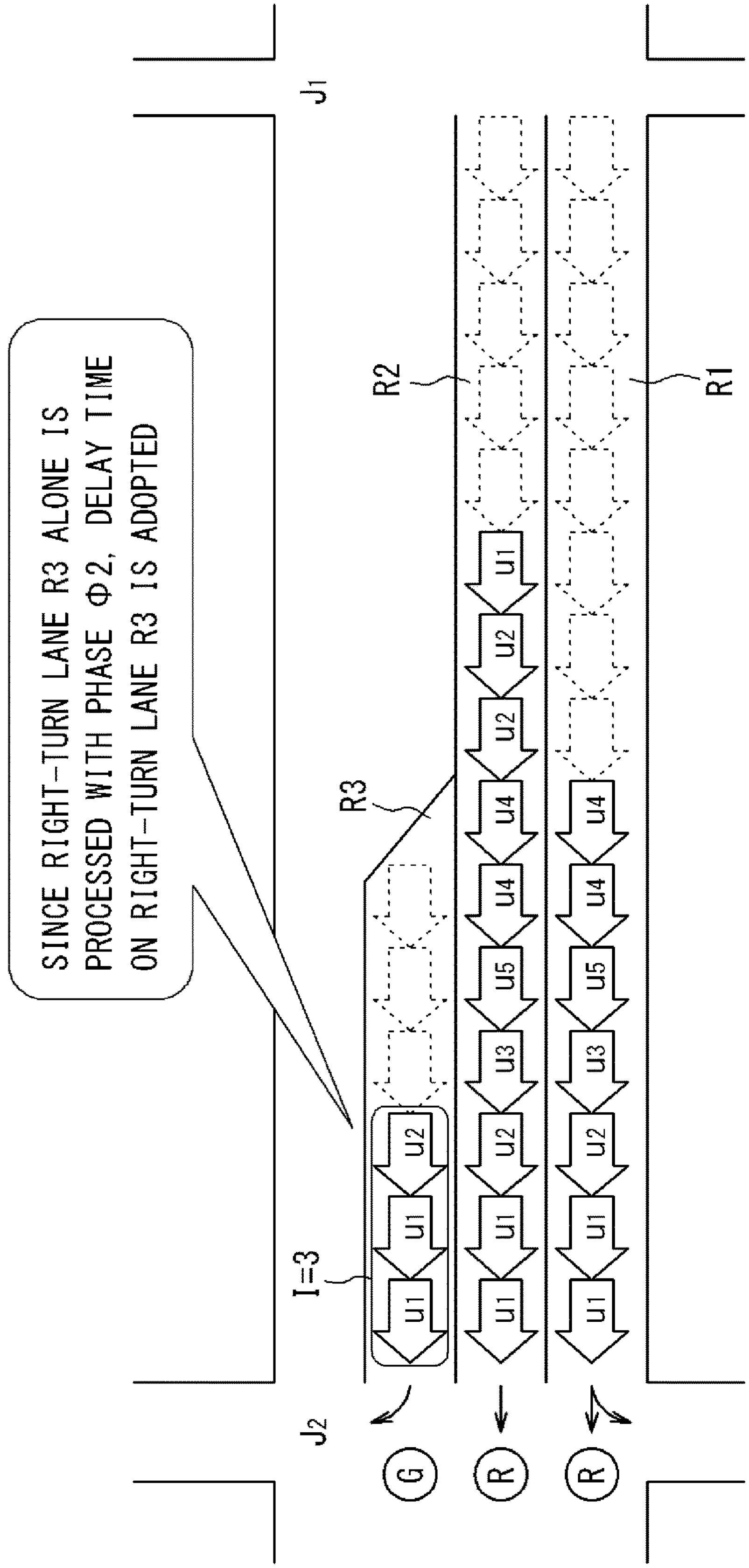
FIG. 14 is an explanatory diagram illustrating an example of a method for calculating a delay time when a link between intersections has a plurality of lanes.

FIGS. 13 and 14 are explanatory diagrams illustrating examples of a method for calculating the delay time dav when the link between intersections J1 and J2 has a plurality of lanes.

As illustrated in FIGS. 13 and 14, the inflow road from intersection J1 to intersection J2 includes a plurality of lanes R1 to R3. Lane R1 is a left-turn and straight through lane. Lane R2 is a straight through lane. Lane R3 is an exclusive right-turn lane.

In addition, on the inflow road at intersection J2, left-turn and straight through lane R1 and straight through lane R2 are given right of way defined by phase φ1, and exclusive right-turn lane R3 is given right of way defined by another phase φ2.

In this case, as illustrated in FIG. 13, when there is a plurality of lanes R1 and R2 processed with the same phase φ1, processing unit 11 of information processing apparatus 2 executes the calculation process (FIG. 11) for calculating the total number of sections I on each of the plurality of lanes R1 and R2, and calculates delay time dav on the inflow road at intersection J2 based on the maximum total number of sections I among the calculated total number of sections I.

For example, in FIG. 13, since the total number of sections I (=10) of lane R2 is greater than the total number of sections I (=7) of lane R1, processing unit 11 executes the processes of steps ST13 and ST14 in FIG. 10 based on the total number of sections I (=10) of lane R2.

In addition, processing unit 11 calculates normalized traffic volume Vin and normalized number of queuing vehicles Qin by applying the calculated delay time dav on lane R2 to Equation (10) or Equation (11), and calculates load ratio Lr or phase saturation Ds based on these traffic indices.

In this case, delay time dav on lane R2 on which many vehicles cannot pass a stop line among the plurality of lanes R1 and R2 processed with the same phase φ1 is calculated.

Therefore, it is possible to accurately calculate the traffic indices (Vin and Qin) of intersection J2 in accordance with the actual traffic situation, and to improve the calculation accuracy of the signal control parameter.

As illustrated in FIG. 14, when only one lane R3 is processed with the same phase φ2, processing unit 11 of information processing apparatus 2 executes the calculation process (FIG. 11) for calculating the total number of sections I only on lane R3, and adopts delay time dav on lane R3 as the data for calculating the signal control parameter.

For example, in FIG. 14, since only the total number of sections I (=3) of lane R3 is calculated, processing unit 11 executes the processes of steps ST13 and ST14 in FIG. 10 based on the total number of sections I (=3) of lane R3.

In addition, processing unit 11 calculates normalized traffic volume Vin and normalized number of queuing vehicles Qin by applying the calculated delay time dav on lane R3 to Equation (10) or Equation (11), and calculates load ratio Lr or phase saturation Ds based on these traffic indices.

At intersection J2 in FIG. 14, when there is a plurality of lanes R3 and R4 for exclusive right-turn, the calculation process (FIG. 11) for calculating the total number of sections I is executed on each of the plurality of lanes R3 and R4, and delay time dav on the inflow road at intersection J2 may be calculated based on the total number of sections I of lane R3 (or R4) having a larger total number of sections I.

Other Modifications

The above-described embodiments (including modifications) are illustrative in all aspects and non-restrictive. The scope of the present invention is intended to embrace all modifications within the range equivalent to the configurations described in the claims.

For example, in the above-described embodiment, information processing apparatus 2 may execute a process of the measurement of the traffic flow (step S11 in FIG. 4), and central apparatus 5 may execute a process of the calculation of the traffic indices and the subsequent processes (steps S12 to S14 in FIG. 4).

When central apparatus 5 can collect and analyze the probe information, central apparatus 5 may perform all the processes from the measurement of the traffic flow to the reflection of the signal control parameter (steps S11 to S14 in FIG. 4).

REFERENCE SIGNS LIST

1 traffic signal control system
2 information processing apparatus (apparatus for calculating delay time)
3 probe vehicle
3X bus
3Y another vehicle
4 on-vehicle device
5 central apparatus (apparatus for calculating delay time)
6 traffic signal controller
6A first controller
6B second controller
7 wireless base station
8 public communication network
9 communication line
10 server computer
11 information processing unit
12 storage unit
13 communication unit (acquisition unit)
14 computer program
21 map database
22 probe database
23 member database
24 signal information database
25 road map data
31 processing unit
32 storage unit
33 communication unit
34 computer program
51 processing unit
52 storage unit
53 communication unit
54 computer program

The invention claimed is:

1. An apparatus for calculating a delay time, the apparatus comprising:

an acquisition unit configured to acquire probe information of a probe vehicle traveling on an inflow road to an intersection; and an information processing unit configured to execute a calculation process for calculating a delay time per vehicle due to waiting at a traffic signal on the inflow road, by using the probe information as source data, the calculation process including a first process for calculating a plurality of section speeds, based on the probe information, each of the plurality of section speeds being an average speed of a vehicle over a corresponding one of a plurality of sections obtained by dividing the inflow road, a second process for calculating the total number of sections, based on the plurality of section speeds, the total number of sections being the total number of sections included in a traffic-signal waiting section of the inflow road, a third process for calculating an average travel time over the traffic-signal waiting section, based on the total number of sections, and a fourth process for calculating the delay time, based on the total number of sections and the average travel time over the traffic-signal waiting section.

2. The apparatus for calculating a delay time according to claim 1, wherein the second process includes a search process for searching for, in order from downstream to upstream of the inflow road, a section satisfying a speed condition in which the section speed is less than or equal to a speed threshold, and counting a section satisfying the speed condition as a section included in the traffic-signal waiting section.

3. The apparatus for calculating a delay time according to claim 2, wherein the second process includes a process for continuing the search process when a length obtained by adding together respective section lengths of one or more sections not satisfying the speed condition is less than a distance threshold.

4. The apparatus for calculating a delay time according to claim 2, wherein the second process includes a process for setting the count value of a section satisfying the speed condition and located most upstream as the total number of sections when a length obtained by adding together respective section lengths of one or more sections not satisfying the speed condition is greater than or equal to a distance threshold.

5. The apparatus for calculating a delay time according to claim 3, wherein each of the plurality of sections has a section length with a value smaller than an interval at which vehicle detectors each configured to measure a vehicle speed are installed.

6. The apparatus for calculating a delay time according to claim 1, wherein the third process is a process for calculating the average travel time over the traffic-signal waiting section by using Equation (16) below:

[Math. 1]

$$Ttt = \sum_{i=1}^{I} \{Li/(Vi/3.6)\} \tag{16}$$

where Ttt is the average travel time (seconds) over the traffic-signal waiting section, Li is a length (m) of section i, Vi is an average speed (km/h) over section i, I is the total number of sections in the traffic-signal waiting section, and i is an identification number of a section assigned in order from downstream to upstream.

7. The apparatus for calculating a delay time according to claim 1, wherein the fourth process is a process for calculating the delay time by using Equation (17) below:

[Math. 2]

$$dav = Ttt - \sum_{i=1}^{I} \{Li/(Ve/3.6)\} \tag{17}$$

where dav is a delay time (an average value) (seconds) per vehicle due to waiting at the traffic signal, Ttt is the average travel time (seconds) over the traffic-signal waiting section, Li is a length (m) of section i, Ve is an expected speed (for example, a regulatory speed) (km/h), I is the total number of sections in the traffic-signal waiting section, and i is an identification number of a section assigned in order from downstream to upstream.

8. The apparatus for calculating a delay time according to claim 1, wherein the inflow road is an inflow road having a plurality of lanes given right of way defined by the same phase, and the information processing unit is configured to execute the second process on each of the plurality of lanes to calculate a plurality of total numbers of sections, and execute the third process and the fourth process, based on a maximum total number of sections among the plurality of total numbers of sections calculated in the second process.

9. A method for calculating a delay time, the method comprising:

acquiring probe information of a probe vehicle traveling on an inflow road to an intersection; and executing a calculation process for calculating a delay time per vehicle due to waiting at a traffic signal on the inflow road, by using the probe information as source data, the calculation process including a first process for calculating a plurality of section speeds, based on the probe information, each of the plurality of section speeds being an average speed of a vehicle over a corresponding one of a plurality of sections obtained by dividing the inflow road, a second process for calculating the total number of sections, based on the plurality of section speeds, the total number of sections being the total number of sections included in a traffic-signal waiting section of the inflow road, a third process for calculating an average travel time over the traffic-signal waiting section, based on the total number of sections, and a fourth process for calculating the delay time, based on the total number of sections and the average travel time over the traffic-signal waiting section.

10. A non-transitory computer readable storage medium storing a computer program for causing a computer to function as:

an acquisition unit configured to acquire probe information of a probe vehicle traveling on an inflow road to an intersection; and an information processing unit configured to execute a calculation process for calculating a delay time per vehicle due to waiting at a traffic signal on the inflow road, by using the probe information as source data, the calculation process including a first process for calculating a plurality of section speeds, based on the probe information, each of the plurality of section speeds being an average speed of a vehicle over a corresponding one of a plurality of sections obtained by dividing the inflow road, a second process for calculating the total number of sections, based on the plurality of section speeds, the total number of sections being the total number of sections included in a traffic-signal waiting section of the inflow road, a third process for calculating an average travel time over the traffic-signal waiting section, based on the total number of sections, and a fourth process for calculating the delay time, based on the total number of sections and the average travel time over the traffic-signal waiting section.

* * * * *